(12) United States Patent
Dang et al.

(10) Patent No.: US 10,394,796 B1
(45) Date of Patent: Aug. 27, 2019

(54) CONTROL SELECTION AND ANALYSIS OF SEARCH ENGINE OPTIMIZATION ACTIVITIES FOR WEB SITES

(71) Applicant: BloomReach Inc., Mountain View, CA (US)

(72) Inventors: Hai Dang, San Jose, CA (US); Rong Pan, Santa Clara, CA (US); Niran Kundapur, Fremont, CA (US); Pradeep Muthukrishnan, Mountain View, CA (US)

(73) Assignee: BloomReach Inc., Mountain View, CA (US)

( * ) Notice: Subject to any disclaimer, the term of this patent is extended or adjusted under 35 U.S.C. 154(b) by 661 days.

(21) Appl. No.: 14/754,481

(22) Filed: Jun. 29, 2015

Related U.S. Application Data

(60) Provisional application No. 62/167,817, filed on May 28, 2015.

(51) Int. Cl.
*G06F 16/23* (2019.01)
*G06F 16/248* (2019.01)
(Continued)

(52) U.S. Cl.
CPC ........ *G06F 16/2365* (2019.01); *G06F 16/248* (2019.01); *G06F 16/24575* (2019.01); *G06F 16/951* (2019.01)

(58) Field of Classification Search
CPC combination set(s) only.
See application file for complete search history.

(56) References Cited

U.S. PATENT DOCUMENTS 8,135,706 B2   3/2012  Yu et al.
8,166,155 B1 *  4/2012  Rachmeler .......... G06F 11/3438
                                                 709/224

(Continued)

FOREIGN PATENT DOCUMENTS

CN    104199830    12/2014
WO    2013126101    8/2013

OTHER PUBLICATIONS

Author Unknown, Making Pinterest, The Official Pinterest Engineering Blog, Demystifying SEO with Experiments, Jan. 27, 2015.
(Continued)

*Primary Examiner* — Van H Oberly
(74) *Attorney, Agent, or Firm* — Moser Taboada

(57) ABSTRACT

Techniques for providing control selection and analysis of Search Engine Optimization (SEO) activities for web sites for web service providers are disclosed. In some embodiments, a system, process, and/or computer program product for providing control selection and analysis of SEO activities for web sites includes selecting a first plurality of web pages associated with a web site for use in a control group of web pages for an experiment; selecting a second plurality of web pages associated with the web site for use in a test group of web pages for the experiment; canonicalizing the control group of web pages and the test group of web pages; and performing the experiment to determine a performance of the test group of web pages relative to the control group of web pages. For example, the test group of web pages can be configured with an SEO content improvement activity.

18 Claims, 18 Drawing Sheets

(51) Int. Cl.
*G06F 16/951* (2019.01)
*G06F 16/2457* (2019.01)

(56) References Cited

U.S. PATENT DOCUMENTS

| | | |
|---|---|---|
| 8,312,022 B2 | 11/2012 | Wilde et al. |
| 8,478,700 B2 | 7/2013 | Yu et al. |
| 8,515,937 B1 | 8/2013 | Sun et al. |
| 8,826,084 B1 | 9/2014 | Gauf et al. |
| 8,954,570 B2 | 2/2015 | Yu et al. |
| 8,972,412 B1 | 3/2015 | Christian et al. |
| 2003/0131005 A1* | 7/2003 | Berry ............... G06F 16/951 |
| 2006/0069667 A1* | 3/2006 | Manasse ............ G06F 16/951 |
| 2009/0292677 A1 | 11/2009 | Kim |
| 2010/0049842 A1* | 2/2010 | Koski ............... H04L 67/2814 |
| | | 709/223 |
| 2011/0219295 A1 | 9/2011 | Adams et al. |
| 2012/0166413 A1 | 6/2012 | LaBaron |
| 2012/0290399 A1* | 11/2012 | England ............ G06Q 30/0282 |
| | | 705/14.66 |
| 2013/0124478 A1 | 5/2013 | Ginzburg et al. |
| 2016/0103913 A1* | 4/2016 | Jacob ................. G06F 16/9566 |
| | | 707/709 |

OTHER PUBLICATIONS

Frydenberg et al., Taking it to the Top: A Lesson in Search Engine Optimization, Information Systems Education Journal, vol. 9, No. 1, Apr. 2011.

Author Unknown, Platform Overview, Google Analytics—Google Developers, Mar. 15, 2015, Retrieved from Internet Archive Wayback Machine http://web.archive.org/web/20150315022811/https://developers.google.com/analytics/devguides/platform/.

\* cited by examiner

CONTROL SELECTION AND ANALYSIS OF SEARCH ENGINE OPTIMIZATION ACTIVITIES FOR WEB SITES

CROSS REFERENCE TO OTHER APPLICATIONS

This application claims priority to U.S. Provisional Patent Application No. 62/167,817 entitled PROCESS AND FINITE STATE MACHINE FOR CONTROL SELECTION AND ROI ANALYSIS AT SCALE OF SEO IMPROVEMENT ACTIVITIES filed May 28, 2015, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Internet-based web services can be delivered through web sites on the World Wide Web. Web pages are often formatted using HyperText Markup Language (HTML), eXtensible HTML (XHTML), or using another language that can be processed by a web browser that is typically executed on a user's client device, such as a computer, tablet, phablet, smart phone, smart watch, smart television, or other (client) device. A web site can be hosted on a web server (e.g., a web server or appliance) that is typically accessible via a network, such as the Internet, through a web address, which is generally known as a Uniform Resource Indicator (URI) or a Uniform Resource Locator (URL).

Search engines can be used to facilitate searching of web services, such as to identify relevant web sites for particular online content and/or services on the World Wide Web. Search engines (e.g., web-based search engines provided by various vendors, including, for example, Google®, Microsoft Bing®, and Yahoo®) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or URIs/URLs for one or more web pages and/or web sites). The search results can include web pages, images, audio, video, database results, directory results, information, and other types of data.

Search engines typically provide paid search results (e.g., the first set of results in the main listing and/or results often presented in a separate listing on, for example, the right side of the output screen). For example, advertisers may pay for placement in such paid search results based on keywords (e.g., keywords in search queries). Search engines also typically provide organic search results, also referred to as natural search results. Organic search results are generally based on various search algorithms employed by different search engines that attempt to provide relevant search results based on a received search query.

For improved Internet-based web services, Search Engine Optimization (SEO) has developed as a form of industry/technical consulting (e.g., often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of searches, including image search, local search, and industry specific, vertical search engines to improve the web site's web presence. For example, SEO often considers how search engines work and what people search for to recommend web site related changes to optimize a web site (e.g., which primarily involves manually editing its content and HTML coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

DETAILED DESCRIPTION

Figure 1:
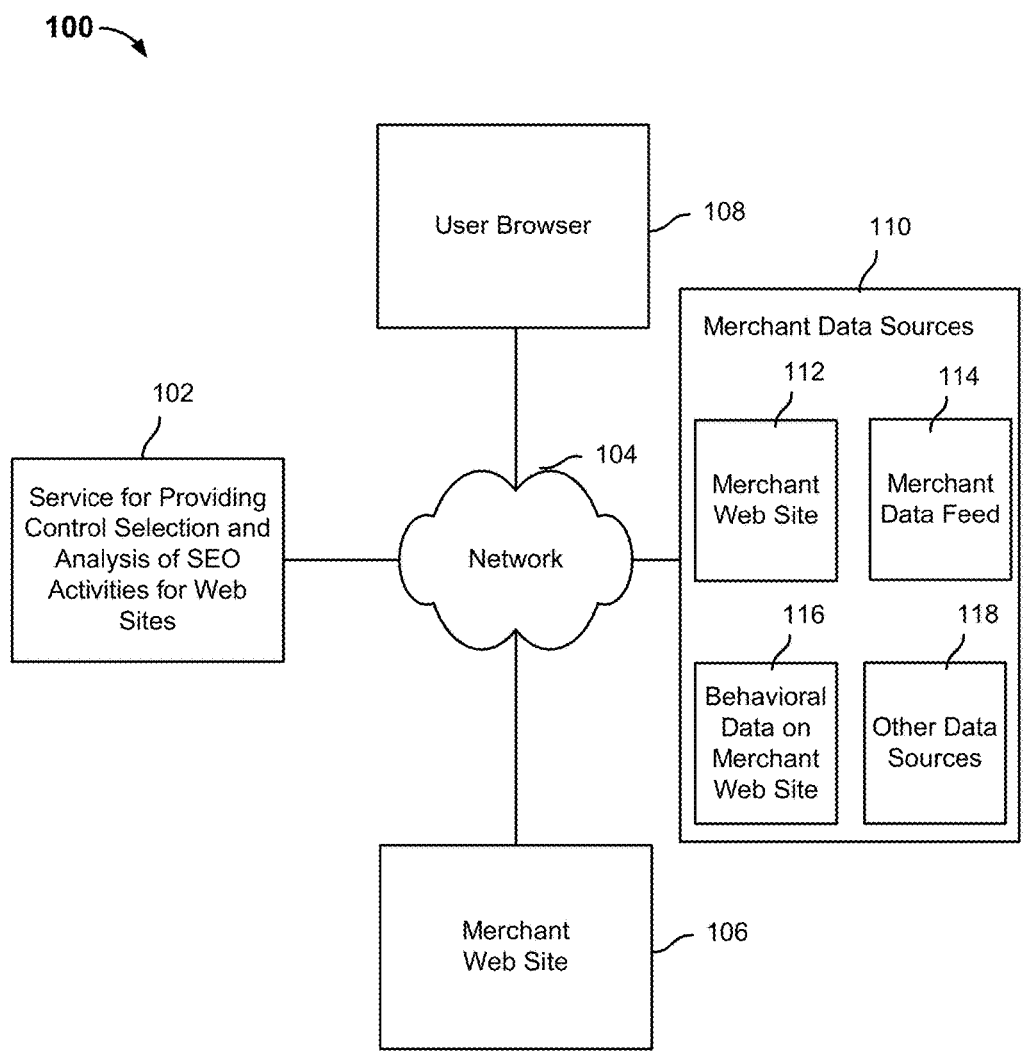
FIG. 1 is a functional block diagram illustrating a network architecture of a service for providing control selection and analysis of Search Engine Optimization (SEO) activities for web sites in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet-based web services can be delivered through web sites on the World Wide Web (WWW). Web pages are often formatted using HyperText Markup Language (HTML), eXtensible HTML (XHTML), or using another markup and/or programming language that can be processed by a web browser that is typically executed on a user's client device, such as a computer, tablet, phablet, smart phone, smart watch, smart television, or other (client) device (e.g., a user computing device). A web site can be hosted on a server (e.g., a web server/appliance and/or an application server/appliance) that is typically accessible via a network, such as the Internet, through a web address, which is generally known as a Uniform Resource Indicator (URI) or a Uniform Resource Locator (URL).

Web sites can generally be classified as static web sites or interactive web sites. Static web sites and interactive web sites are generally described below.

Static web sites generally include static web content. For example, a web site can include one or more static web pages stored on a web server. Such static web pages are basically delivered to a client web browser in the same format that such web pages are stored on the web server (e.g., the same content is presented to each user that navigates to that particular static web page, which provides a consistent presentation of the static content on that web page to each of the different users/visitors of that web page). Static web pages are typically coded in a markup language, such as HTML, and style sheets, such as Cascading Style Sheets (CSS), are also often used to control the appearance or style of such basic HTML web pages. Static content on a static web site is typically manually updated. For example, a web page editor or other tools can be used by a web site owner to edit the static content on a web page (e.g., editing, adding, or deleting text, photos, and/or other content on the web page).

Interactive web sites (e.g., also referred to as dynamic web sites) generally include dynamic web content (e.g., typically dynamic content can be included along with or in addition to various static content on a web site). Specifically, an interactive or dynamic web site generally includes one or more dynamic web pages (e.g., web pages with dynamic content, such as by providing one or more dynamic elements on a web page). In some cases, a dynamic web page can refer to a web page that can change or customize automatically (e.g., to change over time and/or to present different content to different users to personalize web content for different users, etc.). For example, a dynamic web page can be provided using client-side dynamic web pages that are coded, for example, using JavaScript (e.g., or another programming/scripting language, such as Java, Python, and/or other general programming languages) to implement a dynamic web page (e.g., a dynamic HTML web page) that provides instructions to a user's web browser on how to interactively modify content of the web page (e.g., to personalize the content of the web page for a given user or provide other dynamic content for the web page). As another example, dynamic web pages can also be provided using server-side dynamic web pages that are generated automatically (e.g., on the fly) by computer code executed on a server (e.g., a web server or application server) to provide, for example, the HTML and CSS for the dynamically generated content for the web page. Dynamic web pages can generally be implemented using various software platforms/tools (e.g., Java Server Pages, Active Server Pages, HTML forms, and/or other software platforms/tools) and/or using various web application frameworks and web template systems that use general programming languages (e.g., Java, Python, and/or other general programming languages) to facilitate the implementation of dynamic web content for interactive or dynamic web sites.

An e-commerce web site generally refers to a web site that allows users to purchase products or services through the web site (e.g., to facilitate Internet-based web services). E-commerce web sites often include both static and dynamic content on their web sites.

A merchant as used herein generally refers to a third party entity that uses a web site (e.g., on the World Wide Web (WWW)) to engage with customers and/or to buy and sell products and/or services. A merchant web site as used herein generally refers to a web site, such as an e-commerce web site, provided by/for the merchant that facilitates the merchant's online WWW presence to engage with customers and/or to buy and sell products and/or services (e.g., for performing e-commerce on the WWW, such as an e-commerce site that offers products/services for sale, an online news web site that presents news content as an online/web service, and/or a social networking site that provides social networking as an online/web service). Merchant web sites often include both static and dynamic content on their web sites.

Web sites, such as merchant web sites or e-commerce web sites, can include a variety of different static and/or dynamic web page content. The quality of such web content is important to provide an effective web site for users and, therefore, an effective online WWW presence for merchants using e-commerce/merchant web sites to interact with customers and/or potential customers. For example, a merchant web site should generally provide access to content in a manner that is effectively presented to users and facilitates user access and navigation on the merchant web site.

Web sites (e.g., web applications and/or various other web services delivered through web sites) generally store and display content (e.g., products or services related content in the case of a retailer, such as an e-commerce site; various informational related content in the case of a publisher, such as an online news or online magazine site; and/or various other content for other types of merchant sites). For example, this content can be accessed by a user in two primary ways: (1) an internal site search approach; and (2) a non-search approach (e.g., browse and/or site navigation, such as content/category navigation). Web site providers (e.g., for merchant/e-commerce sites) generally attempt to maintain a web site that performs well by providing users (e.g., visitors) of the web site efficient and accurate access to content on the web site through site search and/or content/category navigation.

However, maintaining a web site that performs well by providing users (e.g., visitors) of the web site efficient and accurate access to content on the web site through site search is increasingly challenging as the rate of data generation related to web site activities and/or content has rapidly increased over the last decade. Driven by increases in processing power, Information Technology (IT) investments that record more data about each user, and declining costs of storage, business users who have to make decisions have a significantly increasing amount of data available yet such data is not accessible to them without the assistance of various different IT personnel/experts and/or analytics personnel/experts. For example, accessing and understanding the data often requires an analyst who is specially trained in the company's IT infrastructure to spend hours, days, or weeks analyzing the data. This means the ability to react to quick changes is compromised and the number of actions and results gleaned from the data is often limited as well. For example, given the volume of web site traffic/activity related data, it can be difficult to access the data by the persons who need to apply the data to improve web site performance.

Furthermore, even if a web site operator (e.g., web service provider) were to invest in additional analysts and/or SEO improvement activities, the pace of growth of data generally means that it is very difficult for humans to continuously review this data and/or for such to be a cost-effective approach for efficiently and effectively managing and improving web site performance, such as for enhanced organic search results related performance of the web site. So much data is often being recorded and stored that it would be very difficult for a human to keep up in an error-free, scalable way to timely identify anomalies in the data. For example, given the volume of web site traffic/activity related data, it can be difficult to identify anomalies and/or opportunities in the data (e.g., an anomaly can be an identification of a pattern that many users are leaving the web site on a given web page, and then determining what is the problem that needs to be fixed on the web site so that so many users do not leave the web site on that given web page).

In addition, once a user (e.g., IT personnel or analyst(s), such as an SEO analyst) comes up with a recommended plan of action based on the data, it is often difficult to determine the impact of that action. For example, it can be a significant investment of time and money to configure tracking to report for each change made to a web site so that the user can determine if the action (e.g., SEO improvement activity, such as a content improvement activity on one or more web pages of the web site) had the intended/desired impact on the performance of the web site, such as to improve organic search result related performance of the web site.

As mentioned above, a common approach is to utilize an SEO to facilitate improvement of the performance of the web site. SEO improvement activities can be expensive and, for example, can cost millions of dollars per year. Hence, it is important to measure the improvement result from such SEO activities and/or SEO modifications to the web site (e.g., to determine and/or measure the Return On Investment (ROI) of such SEO related activities).

However, measuring the ROI of SEO activities (e.g., measuring the ROI of SEO activities at scale) is generally difficult to calculate. Example reasons that measuring the ROI of SEO activities at scale is generally difficult to calculate are further discussed below.

Typical web site optimizations at scale use A/B tests in which users of the web site are split randomly into two groups and then one is shown the default version of the page and the other group is shown a variation. A/B testing by splitting users of the web site is typically not an option for the following reasons. By splitting users into two groups, the experiment is evaluating how the presence of the improved content influences the users already on the site. However, such an approach does not evaluate how the improved content influences whether the users will even enter the web site through these web pages from organic search (e.g., organic search results). Another consideration is that search engines generally require that the same content be shown to their web crawlers (e.g., search engine crawlers) as is shown to users. If the content improvement is shown to search engine crawlers all the time, then this requirement is not being met. It is also technically not an option to have the search engine use two different versions of the same page.

For SEO activities related to organic search results, there is generally a dependency on the search engine, and search engine providers typically do not divulge the details of their proprietary search algorithms (e.g., used to generate organic search results). In addition, search engine providers may change the layout of their search results page (e.g., sometimes without advanced notice and that can cause changes in organic search traffic, and such changes are often unrelated to the SEO improvement activity). As a result of these uncertainties, many of the existing SEO related content improvement activities for web sites are typically directed to following best practices and hoping that they apply to a given web site's specific situation.

A related challenge is that changes in the online marketing competitive landscape or user behaviors can result in changes in organic search traffic that can likewise be unrelated to SEO improvement activities. Examples of such changes in the online marketing competitive landscape or user behaviors are users more often shopping directly on Amazon's web site (e.g., users shopping on the www.Amazon.com web site as opposed to specific merchant web sites for various products or services) or users shopping on mobile smart phones/tablets and using certain mobile apps for online shopping (e.g., Amazon app or other shopping apps).

Some SEO improvement activities by their very nature can help improve the entire web site, such as web site speed improvements. As further described below, various content improvement activities are specifically discussed, which often are focused on sub-sections of the web site.

While there are existing ways of measuring ROI of such activities, the existing ways are generally limited in their ability to accurately quantify the ROI of the specific content improvement activity.

Existing ways of measuring ROI of SEO improvement activities include the following: (1) measuring overall site-wide trends before and after the content improvement activity (e.g., example metrics to trend include: (a) organic search sessions; (b) organic search orders and revenue; and (c) ranking of a set of queries in a search engine results page); (2) before and after trends in specific pages that were modified with content improvement activity (e.g., similar metrics as mentioned above could be trended). For example, the before and after trends can be improved by calculating percent change in the metrics year on year.

However, these alternate ways of measuring ROI have the following limitations, which make it difficult to isolate the impact of the specific content improvement activity for a web site. Overall site-wide trends typically will include the trends in pages that the content improvement activity did not modify or affect. Before and after trends may be affected by seasonal changes or unforeseen changes in the search engine algorithms. In order to measure the ranking of a set of queries, a complication is to determine a representative set of queries in advance of the content improvement activity. Given that approximately, for example, 16% of searches seen every day are new and given that queries are not available to the site analytics systems, obtaining a representative set of queries is generally not feasible. Year on year analysis assumes that the same period prior year is an accurate baseline. However, this assumption may not hold, because the consumer demand, product offerings and availability, site structure, and search engine algorithms may not be representative in a given year.

Thus, there is a need for new and improved techniques for providing monitoring of SEO activities for web sites to track whether such SEO activities are improvements.

Overview of Techniques for Providing Control Selection and Analysis of SEO Activities for Web Sites for Web Service Providers Accordingly, techniques for providing control selection and analysis of Search Engine Optimization (SEO) activities for web sites for web service providers are disclosed.

For example, various techniques are disclosed for determining the Return On Investment (ROI) of SEO activities at scale, such as based on measuring SEO activities based on monitoring user activities on the web site associated with organic search results. SEO content improvement activities can be monitored to determine whether such SEO content improvement activities generated new or improved content on web pages that facilitated incremental revenue resulting from visitors entering the web site from organic search. Examples of SEO content improvement activities can include automated SEO widgets (e.g., commercially available solutions, such as Related Searches and Related Products technologies available from BloomReach Inc., are examples of such automated SEO widgets). In an example implementation, an ROI calculation can be determined based on the return as measured in terms of incremental revenue generated from organic search visitors entering the web site from the web pages with the new or improved content (e.g., web pages that include automated SEO widgets and/or other SEO content improvements). In this example, the investment can be determined as the expense of the activity associated with creating the new or improved content on such web pages of the web site.

In some embodiments, a system, process, and/or computer program product for control selection and analysis of Search Engine Optimization (SEO) activities for web sites includes selecting a first plurality of web pages associated with a web site for use in a control group of web pages for an experiment; selecting a second plurality of web pages associated with the web site for use in a test group of web pages for the experiment; canonicalizing the control group of web pages and the test group of web pages; and performing the experiment to determine a performance of the test group of web pages relative to the control group of web pages. For example, the test group of web pages can be configured with an SEO content improvement activity, such as further described below.

In one embodiment, determining the performance of the test group of web pages relative to the control group of web pages further includes measuring the performance of the test group of web pages relative to the control group of web pages based on monitored user activities on the web site associated with organic search result activities, in which the experiment includes one or more automated SEO widgets associated with the test group of web pages.

In one embodiment, the experiment includes one or more automated SEO widgets associated with the test group of web pages, and determining the performance of the test group of web pages relative to the control group of web pages further includes determining whether any of the one or more automated SEO widgets improves performance of the web site based on monitored user activities on the web site associated with organic search result activities.

In one embodiment, canonicalizing the control group of web pages and the test group of web pages further includes removing one or more web pages from the control group or the test group based on an outlier determination. For example, the outlier determination can result from a determination that the one or more web pages has no corresponding web page in the other group based on one or more dimensions (e.g., the one or more selected dimensions can be selected from a page type, a visit level, and/or a department, and/or other extensible dimensions as further described below).

In one embodiment, a system, process, and/or computer program product for providing control selection and analysis of SEO activities for web sites further includes generating a recommendation for improving performance of organic search results on the web site based on the experiment. For example, the recommendation can include an indication of whether one or more automated SEO widgets improves performance of the web site based on monitored user activities on the web site associated with organic search result activities.

In one embodiment, a system, process, and/or computer program product for providing control selection and analysis of SEO activities for web sites further includes displaying a dashboard. For example, the dashboard can display results of the experiment. As another example, the dashboard can display results of the experiment and/or a recommendation for improving performance of organic search results on the web site based on the experiment (e.g., the recommendation can include an indication of whether one or more automated SEO widgets improves performance of the web site based on monitored user activities on the web site associated with organic search result activities, and whether such SEO content improvement activity/activities should be added to one or more other pages of the web site).

In one embodiment, a system, process, and/or computer program product for providing control selection and analysis of SEO activities for web sites further includes monitoring user activities on the web site associated with organic search result activities to determine results of the experiment.

In one embodiment, a system, process, and/or computer program product for providing control selection and analysis of SEO activities for web sites further includes monitoring user activities on the web site associated with organic search result activities to determine results of the experiment; and generating a dashboard for displaying a summary of results of the experiment based on monitored user activities on the web site associated with organic search result activities.

In one embodiment, a system, process, and/or computer program product for providing control selection and analysis of SEO activities for web sites further includes monitoring user activities on the web site associated with organic search result activities to determine results of the experiment; and generating a recommendation for improving performance of organic search results on the web site based on the experiment. For example, the recommendation can include an indication of whether one or more automated SEO widgets improves performance of the web site based on monitored user activities on the web site associated with organic search result activities.

In one embodiment, a system, process, and/or computer program product for providing control selection and analysis of SEO activities for web sites further includes monitoring one or more web site metrics relevant for organic search associated with a web page in the control group or the test group. Example web site metrics relevant for organic search include a level of visits, conversions, revenue, add to cart, and/or various other web site metrics.

In one embodiment, a system, process, and/or computer program product for providing control selection and analysis of SEO activities for web sites further includes determining a performance of each of the web pages in the test group relative to each of the web pages in the control group based on the monitored one or more web site metrics relevant for organic search associated with the web page in the control group or the test group.

In one embodiment, a system, process, and/or computer program product for providing control selection and analysis of SEO activities for web sites further includes generating a report of the experiment. For example, the report can include various performance results and/or metrics, such as further described below. In an example implementation, the report can be displayed via a dashboard (e.g., implemented as a web page presented via a web site provided by a service provider for the service for providing control selection and analysis of SEO activities for web sites).

In one embodiment, a system, process, and/or computer program product for providing control selection and analysis of SEO activities for web sites further includes pre-processing of web pages (e.g., fetched web pages from the web site) to select for the control group or the test group. For example, the pre-processing can include removing error pages, removing redirect pages, and/or performing various other pre-processing operations, such as further described below.

In one embodiment, a system, process, and/or computer program product for providing control selection and analysis of SEO activities for web sites further includes periodically performing the pre-processing of the web pages, such as further described below. For example, the pre-processing of the web pages can be continuously performed (e.g., on a periodic basis) to verify the web pages for inclusion in the test group and/or the control group.

In one embodiment, a system, process, and/or computer program product for providing control selection and analysis of SEO activities for web sites further includes performing multiple concurrent experiments. For example, a first experiment for a first test group and a first control group can be concurrently performed on the web site as a second experiment for a second test group and a second control group, such as further described below.

In one embodiment, a system, process, and/or computer program product for providing control selection and analysis of SEO activities for web sites further includes automatically selecting groups of web pages that are comparable/representative based on a selected set of dimensions. Example dimensions can include page type, visit level, department (e.g., shoes, dresses, chairs, etc.), which can be implemented as default dimension options; and extensible dimension options can include margin, inventory levels, sub-categories, brands, and/or other dimension options, such as further described below.

In one embodiment, a system, process, and/or computer program product for providing control selection and analysis of SEO activities for web sites further includes removing outlier web pages from the test group and/or the control group. For example, a web page can be determined to be an outlier web page that can be removed from the test group and/or the control group if there is no comparable web page in the other group based on one or more selected dimensions (e.g., default or extensible dimensions).

In one embodiment, a system, process, and/or computer program product for providing control selection and analysis of SEO activities for web sites further includes monitoring performance of the web site based on the experiment. Examples of metrics that can be used to measure performance of the web site based on the experiment include track visits, conversions, revenue, add to card (ATC), and/or various other web site performance related metrics (e.g., web site performance related metrics indicative of the performance of the web site relevant to organic search results).

In one embodiment, a system, process, and/or computer program product for providing control selection and analysis of SEO activities for web sites further includes starting and/or stopping the experiment (e.g., one or more tests for one or more sets of test/control groups of web pages). For example, experiments can include turning on/off an SEO activity/improvement (e.g., an automated SEO widget) on one or more web pages of the web site (e.g., turn off experiment includes turning off an automated SEO widget; and turning on/off the experiment facilitates measuring improvement (if any) associated with the SEO activity being tested by the experiment).

In one embodiment, a system, process, and/or computer program product for providing control selection and analysis of SEO activities for web sites further includes a finite state machine that is used to capture a state of a URL (e.g., a web page of the web site) and a state of a merchant (e.g., as well as the allowed actions that can be done when the URL or the merchant is in a particular state). An example implementation of the finite state machine is further described below with respect to various embodiments.

In an example implementation, a service for providing control selection and analysis of SEO activities for web sites for web service providers can be delivered by a third-party outsource/service provider, such as described herein.

As further described below, these and various other features and techniques are disclosed for providing control selection and analysis of SEO activities for web sites for web service providers to enhance online web services (e.g., Internet-based web services), such as for web sites (e.g., e-commerce/merchant sites and/or other types of web sites).

Overview of a Service for Providing Control Selection and Analysis of SEO Activities for Web Sites for Web Service Providers FIG. 1 is a functional block diagram illustrating a network architecture of a service for providing control selection and analysis of Search Engine Optimization (SEO) activities for web sites in accordance with some embodiments. FIG. 1 provides an exemplary network architecture 100 for providing control selection and analysis of SEO activities for web sites for web service providers that can be implemented using various computing hardware and performing various processes executed on computing hardware as will be further described below.

Referring to FIG. 1, a service for providing control selection and analysis of SEO activities for web sites for web service providers 102 is shown in communication with a network 104, such as the Internet. Service for providing control selection and analysis of SEO activities for web sites 102 is in communication with one or more web sites (e.g., e-commerce/merchant sites and/or other sites), such as a merchant web site 106 as shown. Merchant web site 106 can be in communication via network 104 with one or more user browsers, such as a user browser 108 as shown (e.g., a web browser, such as Apple Safari®, Google Chrome®, Microsoft Internet Explorer®, or another web browser, which can be executed on a user client device, such as a laptop/desktop computer, tablet, smart phone, smart watch, or another client device capable of Internet/WWW access). Service for providing control selection and analysis of SEO activities for web sites 102 is also in communication with various data sources (e.g., merchant web services related data sources) via network 104, such as further described below.

As also shown in FIG. 1, data sources include various web site related data sources, shown as merchant data sources 110. As shown, merchant data sources 110 can include a merchant web site 112 (e.g., a corpus of web pages, such as one or more web pages that are published on the merchant's web site 106, which can be captured using web crawling techniques to periodically crawl web pages of merchant web site 106, such as further described below), a merchant content data feed 114 (e.g., a merchant product data feed and/or other merchant content data feed, such as further described below with respect to various embodiments), behavioral data on the merchant web site 116 (e.g., user behavior on merchant web site 106 can be captured using pixel log data techniques, such as further described below), and various other data sources 118 (e.g., various other web data sources including a site map of the web site, web server/API logs, as well as various other potential web related data sources, such as search logs, social media data sources, electronic mail data sources, browsing history data sources, and/or other data sources can be provided).

As will now be apparent to one of ordinary skill in the art, similar web services related data for a plurality of different web sites (e.g., different e-commerce/merchant web sites and/or other types of web sites) can be provided to facilitate the service for providing control selection and analysis of SEO activities for web sites 102 implemented as, for example, a cloud service for enhancing performance of merchant web sites and/or other web sites by applying the disclosed techniques for providing control selection and analysis of SEO activities for web sites for web service providers (e.g., a subscription service for the service for providing control selection and analysis of SEO activities for merchant/e-commerce web sites, which can be implemented as a cloud service), such as further described herein.

In an example implementation, service for providing control selection and analysis of SEO activities for web sites 102 is in communication with each of the merchant data sources, such as shown in FIG. 1, to receive or collect merchant web site data, merchant data feeds, behavior data on the merchant web sites, and/or other data sources for each of the one or more merchants. For example, merchants can subscribe to the service for providing control selection and analysis of SEO activities for web sites 102 implemented as a cloud service for enhancing performance of merchant web sites and/or other web sites (e.g., in which the cloud service can be implemented using a cloud service provider, such as using Amazon Web Services™ (AWS) or other cloud service data center providers, such as further described below).

In one embodiment, the above-described data sources (e.g., data sources 110 such as for a given merchant and/or other data sources for other merchants) can be processed using various techniques as described below. For example, a web site content crawling process can be performed (e.g., implemented using a web site content crawler/site fetcher) to periodically crawl and fetch web pages on a target web site (e.g., to periodically crawl and fetch web pages on a subscribing merchant web site 106, and also shown as a data source, merchant web site 112 of merchant data sources 110). The content (e.g., HTML content, dynamic content such as Java Script content, and/or other content) can be fetched from the merchant web site, and the web site content (e.g., of each crawled and fetched web page of the web site) can then be parsed, stored, and analyzed using the disclosed techniques (e.g., using a web page parser), such as further described below. As another example, in some cases, a merchant data feed retrieving process can be performed (e.g., implemented using a merchant data feed retrieving engine) to retrieve merchant content/product data feeds (e.g., merchant data feed 114) and parse product attributes, such as title, heading, description, and/or price. In some cases, a merchant data feed can be used to analyze whether content in a merchant content/product data feed is accessible via the merchant web site as an example measure of performance related to content on the web site using the disclosed techniques, such as further described below. As yet another example, a behavior data collection process can be performed (e.g., implemented using a behavioral data collection engine) using pixel data on a merchant's web site. Using this approach, when a user visits a web page of a given merchant's web site, then dynamic content (e.g., Java Script code or other dynamic code/content) on the web page generates a pixel request to the merchant data sources (e.g., a server that is provided for capturing behavioral data on the merchant web site, such as shown as merchant data sources 110) that includes, for example, a machine IP (e.g., the IP address associated with the user's device), a user ID (optional), a referrer URL (e.g., the URL of the web page that preceded the web page in question), a web page URL, and/or other information (optional). In this example, raw pixel data can then be provided from each of the merchants (e.g., shown as behavioral data 116 for merchant web site 106). Each of the data sources is described in more detail below in accordance with various embodiments.

As similarly described above, a continuous process can be performed to crawl and fetch pages from a subscribing web site (e.g., implemented using a web site crawler component, which can be implemented to perform crawling and fetching operations as described herein). For example, the crawling and fetching operation can receive as input a list of URLs on a merchant web site and fetch the content of each such web page (e.g., HTML and/or other content on each of the fetched web pages). As further described below, the content of a fetched web page can then be parsed by applying various parsing rules (e.g., implemented using a parser component) configured for web pages (e.g., manually configured for a particular merchant's web pages or using a default configuration for parsing typical merchant web pages). For example, the parser operation can parse each page to extract various elements and/or content related attributes, such as further described below. As such, content published on a merchant's web site can be fetched and parsed, and the merchant's web site content can then be used for performing the disclosed techniques for providing control selection and analysis of SEO activities for web sites for web service providers as further described below.

In some cases, a process can also be performed to retrieve merchant content/product data feeds for each of the merchants (e.g., implemented using a merchant data feed retriever component as disclosed herein). In an example implementation, the merchant can either provide a location to fetch the merchant data feed or upload the merchant data feed to a location specified for retrieving (e.g., pulling) the merchant data feed (e.g., periodically or upon demand). For example, the merchant data feed can be provided as a file (e.g., in a format that can be parsed, such as in an XML or other file format that provides a (subset) view of, for example, a merchant's product/service catalog, such as by providing incremental updates to product catalog information using such merchant data feeds). In this example, the merchant data feed includes a content classification (e.g., a merchant product data feed can include a product classification) that can then be used for performing various techniques disclosed herein for providing control selection and analysis of SEO activities for web sites for web service providers. In some cases, the merchant data feed can be provided on a daily or hourly basis (e.g., or at some other periodic/time interval and/or based on demand). For example, the merchant data feed can be parsed using parsing rules configured for a given merchant or a set of merchants (e.g., based on types/groups of merchants) to extract attributes, such as title, heading, and description. In some cases, the merchant data feed can also include a content classification (e.g., a merchant product data feed can include a product classification) that can then be used for performing various techniques disclosed herein for providing control selection and analysis of SEO activities for web sites for web service providers.

Another data source of information is behavioral user data on a web site, such as merchant web site 106. In some cases, a user may visit a merchant web page, such as a user using user browser 108 via network 104. For example, Java Script code (e.g., or other executable code/content) on the web page can make a pixel request to a server/service (e.g., to a server/service of the merchant data sources and/or a server/service of the service provider for the service for providing control selection and analysis of SEO activities for web sites for web service providers) that includes, for example, a machine IP (e.g., the IP address associated with the user's device), a user ID (optional), a referrer URL, a web page URL, and/or other information (optional). The list of web page URLs can be combined periodically (e.g., each day or at some other periodic interval, implemented using an activity processor and co-visit pipelines/aggregator for collecting and aggregating web site activity, such as further described below with respect to FIG. 2) and provided as input to the above-described fetching and parsing process to extract information from web pages of a merchant's web site (e.g., each day or at some other periodic interval, implemented using a web crawler and web content aggregator for collecting and aggregating web site content, such as further described below with respect to FIG. 2). In an example implementation, for each user, information can be stored to identify products visited and purchased by the user. Similarly, information can be stored to aggregate all user visits and products purchased on the merchant web site. As such, various web site activity related metrics, such as number of impressions, number of views, number of purchases, and/or other metrics, can be collected to provide behavioral data on a merchant's web site, and the behavioral data on the merchant's web site can then be used for performing various techniques disclosed herein for providing control selection and analysis of SEO activities for web sites for web service providers. For example, behavior data on a merchant's web site can be used to measure web site performance during an experiment, such as further described below.

In one embodiment, the above-described processes for merchant data source collection and processing are performed per each merchant. For example, each merchant's data is processed independently using the above-described processes for processing each merchant's respective data sources to implement techniques disclosed herein for providing control selection and analysis of SEO activities for each of the merchant's respective web sites.

In an example use case scenario, techniques disclosed herein for providing control selection and analysis of SEO activities for web sites for web service providers, such as implemented by service for providing control selection and analysis of SEO activities for web sites 102, can be implemented for merchant web site 106. For example, an e-commerce web site for ACME Company that sells various clothing/apparel products can use the service to measure ROI of SEO activities of the web site (e.g., ACME can subscribe to the service, which can be provided as a cloud service). In an example implementation, the service for providing control selection and analysis of SEO activities for web sites for web service providers generates a dashboard that can provide results/reports based on one or more experiments and monitored performance of ACME's web site by applying the disclosed techniques. As an example, the dashboard can provide a report that includes a summary of results of an experiment performed on ACME's web site using the disclosed techniques for providing control selection and analysis of SEO activities for web sites for web service providers as further described below.

In an example implementation, the disclosed techniques can be delivered by a third-party outsource/service provider as service for providing the disclosed techniques for providing control selection and analysis of SEO activities for web sites for web service providers 102, such as described herein.

An example of a system architecture of service for providing the disclosed techniques for providing control selection and analysis of SEO activities for web sites for web service providers 102 of FIG. 1 will now be described with respect to FIG. 2. Techniques for providing the disclosed techniques for providing control selection and analysis of SEO activities for web sites for web service providers are also described below with respect to FIG. 2.

Figure 2:
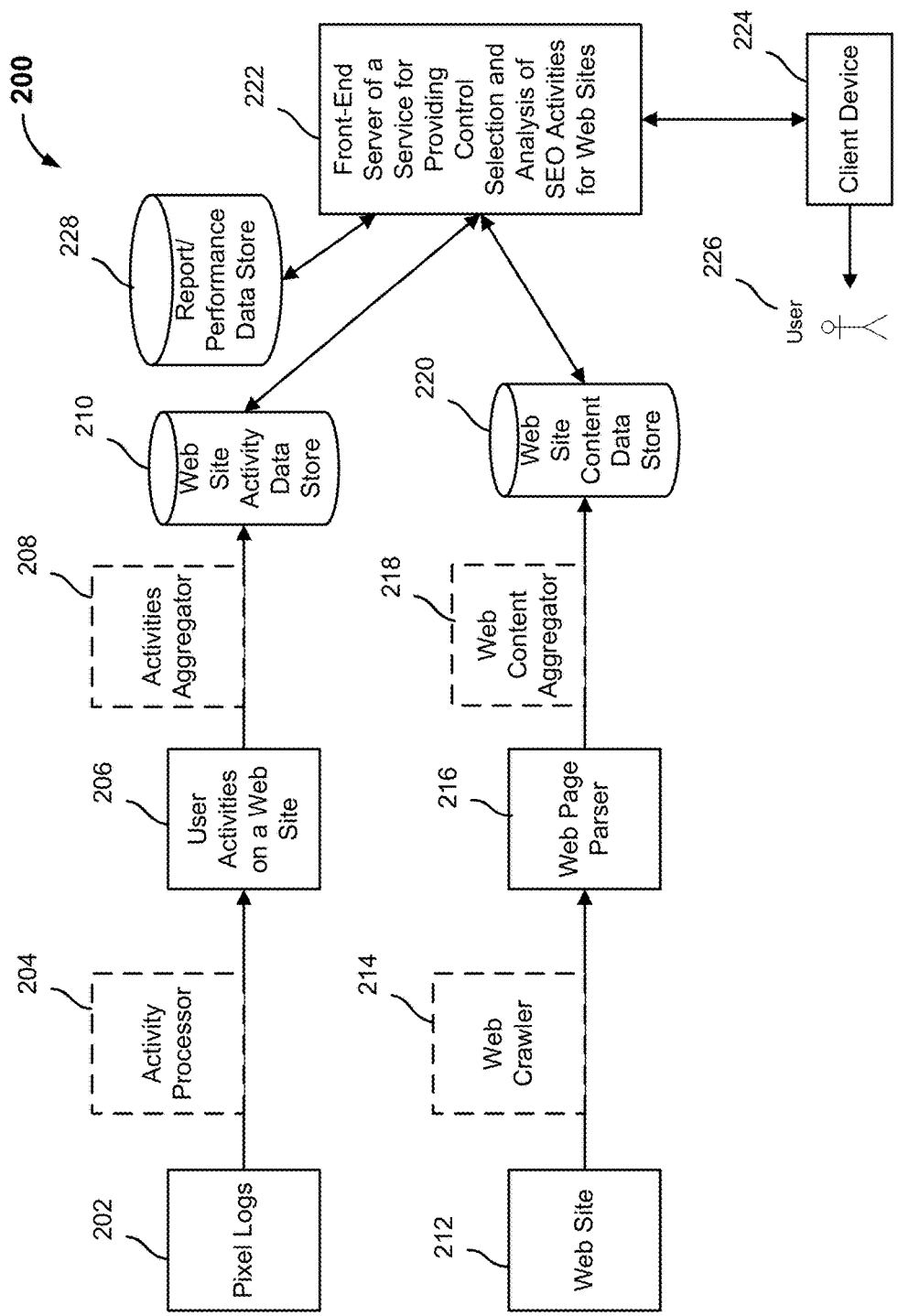
FIG. 2 is a functional block diagram illustrating an architecture of a system environment for providing control selection and analysis of SEO activities for web sites in accordance with some embodiments.

System Architecture for Providing Control Selection and Analysis of SEO Activities for Web Sites for Web Service Providers FIG. 2 is a functional block diagram illustrating an architecture of a system environment for providing control selection and analysis of SEO activities for web sites in accordance with some embodiments. In particular, various components of service for providing control selection and analysis of SEO activities for web sites 102 are shown in FIG. 2 in accordance with some embodiments.

As shown in FIG. 2, an architecture of service/system for providing control selection and analysis of SEO activities for web sites for web service providers 200 can be implemented using several components to facilitate providing control selection and analysis of SEO activities for web sites (e.g., dashboards/reports, recommendations, and/or monitoring of SEO improvement activities) for a given web site in accordance with some embodiments. As will be apparent to one of ordinary skill in the art, the various components (e.g., data stores, subsystems/engines, and other (sub)components) shown in FIG. 2 are an example implementation of an architecture for a service/system for providing control selection and analysis of SEO activities for web sites for web service providers, and such components can be integrated and/or further separated into distinct sub-components to similarly implement the disclosed techniques for providing control selection and analysis of SEO activities for web sites for web service providers.

In one embodiment, service/system 200 is configured to provide control selection and analysis of SEO activities for web sites (e.g., based on content of web pages associated with a web site, including any SEO content improvements/widgets, and user activities monitored on the web site) using a variety of disclosed techniques for providing control selection and analysis of SEO activities for web sites for web service providers, such as described below. For example, service/system 200 can generate a report and recommendations to enhance performance of a web site, such as further described below. As another example, service/system 200 can measure performance associated with SEO content improvement activities on the web site based on one or more experiments, such as further described below. These and other disclosed techniques that can be performed using system/service for providing control selection and analysis of SEO activities for web sites for web service providers 200 are further described below.

As such, the disclosed techniques for providing control selection and analysis of SEO activities for web sites for web service providers include new and improved solutions for measuring the performance of SEO activities for a web site (e.g., facilitating an ROI measure for SEO improvement activities for the web site). For example, such new and improved techniques can be implemented using the disclosed system for providing control selection and analysis of SEO activities for web sites for web service providers to associate behavioral data to an analysis of the web site content, such as visits and revenue, and provide metrics, reports, and recommendations associated with this correlated analysis over time based on one or more experiments that can provide a measure of SEO improvement activities, such as further discussed below. These and other techniques are further described below with respect to the system for providing control selection and analysis of SEO activities for web sites for web service providers shown in FIG. 2.

Referring to FIG. 2, service/system for providing control selection and analysis of SEO activities for web sites for web service providers 200 includes receiving pixel logs 202 (e.g., pixel log data as similarly described above) that can be processed using an activity processor 204 to collect user activities on a monitored web site (e.g., a web site subscribed to the service for providing control selection and analysis of SEO activities for web sites) as shown at 206 (e.g., activities on a web site, including, for example, a total number of visits, searches on a web site, revenue data, pages visited, Add To Cart (ATC) data, exiting the web site, etc.). For example, a merchant can have a web site, such as an e-commerce site or other type of site, and the merchant can be a customer (e.g., subscriber) to a service for providing control selection and analysis of SEO activities for web sites that is implemented using the system for providing control selection and analysis of SEO activities for web sites as further described below. An activities aggregator 208 aggregates the user activity data for storing in a web site activity data store 210 (e.g., a structured data store, such as an SQL database or other type of commercially available and/or open source data store).

In one embodiment, merchant data sources used by service/system for providing control selection and analysis of SEO activities for web sites 200 include behavioral data, which can include user activity data based on user interactions with the merchant web site. For example, the behavioral data can be captured and provided to the system for providing control selection and analysis of SEO activities for web sites using pixel log data techniques collected using pixel logs 202 as shown in FIG. 2, such as described above. In an example implementation, behavior data on a merchant's web site can be used to determine web site performance relevant to an experiment performed on the web site (e.g., based on traffic and/or revenue in behavior data, based on user activity relevant to one or more web pages on the web site in a test group and/or control group, and/or based on other content and/or activity data and analysis), such as further described below.

As also shown in FIG. 2, service/system for providing control selection and analysis of SEO activities for web sites 200 includes receiving web content from a monitored web site 212 that can be collected using a web crawler 214 to collect web pages on the monitored web site that can then be parsed using a web page parser 216 to extract web content of interest (e.g., category names, products, prices, links, etc.). For example, a merchant can have a web site, such as an e-commerce site or other type of site, and the merchant can be a customer (e.g., subscriber) to a service for providing control selection and analysis of SEO activities for web sites for web service providers that is implemented using the system for providing control selection and analysis of SEO activities for web sites as further described below. A web content aggregator 218 aggregates the collected and parsed web content data for storing in a web site content data store 220 (e.g., an unstructured data store, such as an Apache Solr™ database or other type of commercially available and/or open source data store).

As also shown, service/system for providing control selection and analysis of SEO activities for web sites 200 includes a front-end server for control selection and analysis of SEO activities for web sites 222 that is in communication with web site activity data store 210 and web site content data store 220. A user 226 (e.g., an authorized user of the subscribing customer) accesses front-end server for control selection and analysis of SEO activities for web sites 222 via a client device 224 (e.g., a desktop, laptop, smart phone, tablet, or other type of computing device via the Internet using a web browser or other network communication protocol and interface).

In one embodiment, a web site 212 (e.g., an e-commerce/merchant web site or other type of web site) includes a corpus of content (e.g., a plurality of web pages). The web site can be crawled using web crawler 214 (e.g., a site fetcher), such as further described below.

In one embodiment, additional merchant data sources used by service/system for providing control selection and analysis of SEO activities for web sites 200 include a merchant data feed (e.g., which can be retrieved/received daily, hourly, or on some other periodic interval, schedule, and/or on demand and processed using another pipeline (not shown in FIG. 2) for storing in a structured data store), such as similarly described above with respect to FIG. 1. For example, the merchant data feed can include a product data feed that provides information included in the merchant's product catalog (e.g., in an XML format file or another format that can be parsed to extract attributes associated with products offered by a merchant, and can be provided as an incremental update to the merchant's product catalog). The merchant data feed can be collected by and/or sent to service/system for providing control selection and analysis of SEO activities for web sites 200 (e.g., and stored in the web site content data store or another data store, such as a structured data store for the product catalog data) as similarly described above with respect to FIG. 1.

In one embodiment, additional merchant data sources used by service/system for providing control selection and analysis of SEO activities for web sites 200 include a site map for web site 212. For example, the site map can provide a list of pages of the merchant web site (e.g., a list of URLs, which can be in an XML file format or other format) that are accessible to web crawlers or users, which can be used by web crawler 214 for crawling the merchant web site, such as further described below.

In one embodiment, additional merchant data sources used by service/system for providing control selection and analysis of SEO activities for web sites 200 include web server/API logs. For example, web server/API logs can provide server and API related logs for the server that hosts the merchant web site, which can be used by the system for providing control selection and analysis of SEO activities for web sites to perform various disclosed techniques for providing control selection and analysis of SEO activities for web sites, such as further described below.

As also shown, web pages on a web site (e.g., a merchant web site or other web site) are crawled and fetched using web crawler 214 (e.g., a web crawler/site fetcher that can crawl one or more URLs associated with the merchant web site and fetch content from each of the crawled web pages for storing and processing for techniques for providing control selection and analysis of SEO activities for web sites as further described below). For example, the web crawler can be configured to automatically perform this operation on a daily basis, weekly basis, or at some other periodic interval, schedule, and/or on demand. The crawled and fetched web pages (e.g., content available on the crawled web site) can be stored in a data store shown as web site content data store 220 (e.g., for storing the content from the crawled and fetched pages of the web site). As further described below, the stored content can be indexed to facilitate searching of the content. For example, the stored content shown at web site content data store 220 can be indexed using an Apache Solr™ open source enterprise platform or another commercially available or open source indexing platform.

Reporting and Actions Based on Monitored Web Site Performance

In one embodiment, service/system for providing control selection and analysis of SEO activities for web sites 102 generates reports that can report information (e.g., a report or other performance summary can be presented to a user via a dashboard) that provides results of one or more experiments performed using the disclosed techniques. Various types of reports can be sent from service/system for providing control selection and analysis of SEO activities for web sites 102 to a report/performance data store 228 (e.g., maintained by a back-end or front-end of the service/system for control selection and analysis of SEO activities for web sites for web service providers, such as being stored in a web site performance data store as shown at 228). As further described below, the stored content stored in web site content data store 220 and the web site performance/report data stored in the report/web site performance data store can be indexed to facilitate searching of the content and report/performance data. For example, the stored report/performance data can be indexed using an Apache Solr™ open source enterprise platform or another commercially available or open source indexing platform.

In one embodiment, service/system for providing control selection and analysis of SEO activities for web sites 200 is configured to perform one or more experiments that are requested to be performed by a user (e.g., an authorized user of the subscribing customer for the merchant web site). For example, the system for providing control selection and analysis of SEO activities for web sites can automatically test SEO improvement activities by performing such experiments (e.g., turning on an experiment can include turning on an automated SEO widget on one or more of the test web pages, such as using a related products widget and/or related searches widget as further described below). In an example implementation, such widgets can be dynamically populated via a remote API (Application Program Interface) call or other data delivery mechanism.

In an example implementation, service/system for providing control selection and analysis of SEO activities for web sites 200 is implemented using a cloud computing service, such as using Amazon Web Services™ (AWS), and the various data stores (e.g., web site activity data store 210, web site content data store 220, and/or report/performance data store 228) can be implemented using a cloud data warehouse solution, such as using Amazon Redshift™, which provides a fast, fully managed petabyte-scale data warehouse solution. In an example implementation, the above-described pipelines (e.g., and/or additional pipelines, such as for processing a merchant product data feed) are implemented as jobs that can be executed periodically (e.g., once per day, at night, and/or at some other interval) executed on server class hardware (e.g., AWS Redshift). For example, the data fetched/received from various merchant data sources (e.g., merchant data sources 110 as shown in FIG. 1) can be processed by service/system for providing control selection and analysis of SEO activities for web sites 200 by performing a MapReduce job (e.g., implemented using the Apache® Hadoop™ framework for performing a distributed processing of large data sets across clusters of computers, for example, using server class hardware, such as provided by the AWS cloud computing environment). In an example implementation, the above-described front-end server can also be performed on server class hardware (e.g., AWS Redshift), which can execute queries against the data store to generate results and/or reports to present to a user accessing the front-end server via a client device executing a web browser as further described below.

Front-End Server for Providing Control Selection and Analysis of SEO Activities for Web Sites for Web Service Providers As also shown in FIG. 2, a front-end server of a service for providing control selection and analysis of SEO activities for web sites 222 is in communication with report/performance data store 228. For example, the front-end server can be implemented as a web user interface that facilitates user interactions, such as a user 226 (e.g., an admin of a merchant web site who is an authorized user to access the dashboard/reports and to perform experiments on the merchant web site), to access the dashboard/reports (e.g., over the Internet, such as using a secure protocol, such as HTTPS or another secure protocol). Example web site performance dashboards/reports are further described below. In some cases, the user can use the front-end server to configure and/or perform experiments for a web site (e.g., the merchant site that has been analyzed by service/system 200 using the disclosed techniques for providing control selection and analysis of SEO activities), such as further described below.

In one embodiment, the above-described processes for merchant data sources' collection and processing are performed per each merchant. For example, each merchant's data is processed independently using the above-described processes for processing each merchant's respective data sources to implement various techniques disclosed herein for each of the merchant's respective web sites.

An example component diagram showing various components of service/system for providing control selection and analysis of SEO activities for web sites 102 of FIG. 1 will now be described with respect to FIG. 3. Techniques for providing control selection and analysis of SEO activities for web sites are also described below with respect to FIG. 3.

Figure 3:
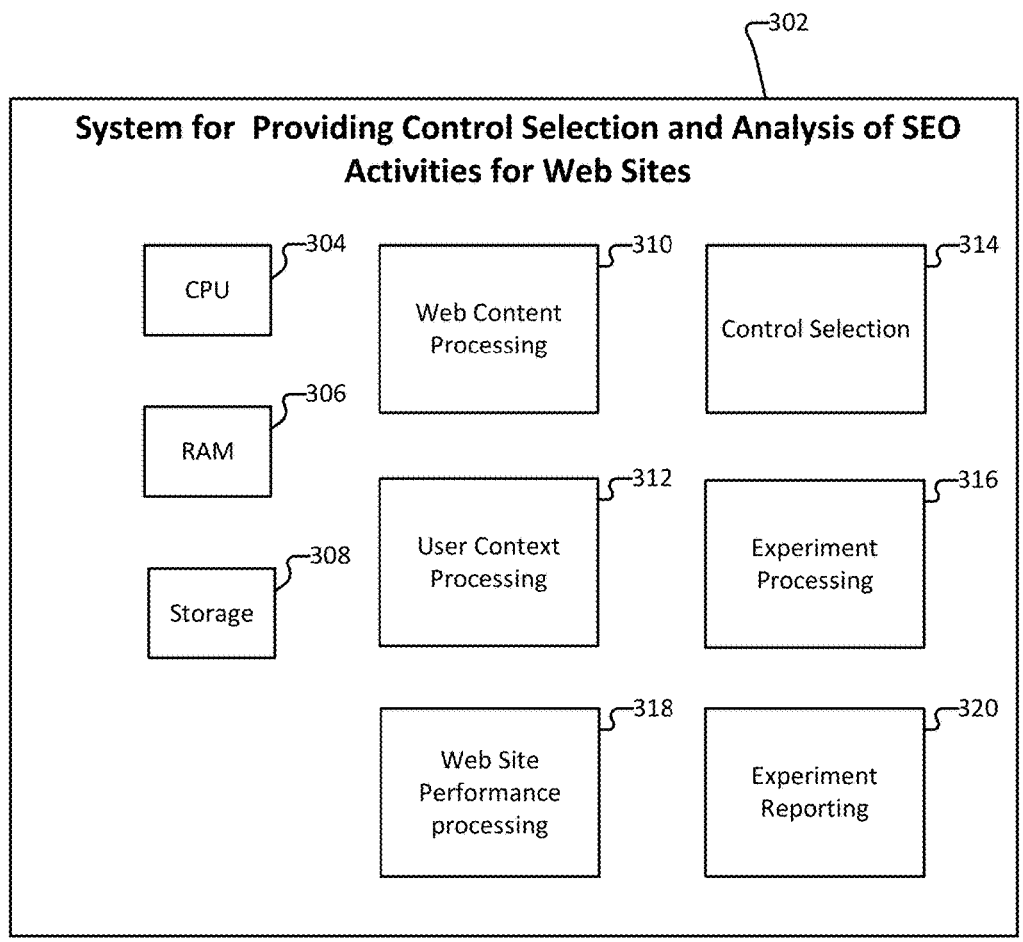
FIG. 3 is a component diagram illustrating components of a system for providing control selection and analysis of SEO activities for web sites in accordance with some embodiments.

FIG. 3 is a component diagram illustrating components of a system for providing control selection and analysis of SEO activities for web sites in accordance with some embodiments. As shown, a system for providing control selection and analysis of SEO activities for web sites 302 includes a CPU 304, a RAM 306, and a data storage 308. For example, system 302 can be implemented to provide service/system for providing control selection and analysis of SEO activities for web sites 102 as shown in FIG. 1 and as also shown in FIG. 2.

As also shown in FIG. 3, system 302 includes a web content processing component 310 (e.g., to process web content of a web site to implement various techniques described herein). In one embodiment, system 302 also includes a user context processing component 312 (e.g., behavior signal data that provides monitored/tracked user activities data can be provided for subscriber/monitored web sites by using click logs/pixel tags data for monitoring user activities during a session to provide a user's browsing history, and/or other behavior signal data as described herein). In one embodiment, system 302 also includes a control selection component 314 (e.g., for selecting a control group and a test group of web pages for an experiment to be performed on a subscriber/monitored web site using various techniques described herein). In one embodiment, system 302 also includes an experiment processing component 316 (e.g., for performing one or more (in some cases, concurrent) experiments on a subscriber/monitored web site using various techniques described herein). In one embodiment, system 302 also includes web site performance processing component 318 (e.g., for processing performance signals associated with one or more web pages associated with the control/test groups of a given experiment performed on a subscriber/monitored web site, which can be used to generate performance reports based on experiments performed on the web site, as further described herein). In one embodiment, system 302 also includes an experiment reporting component 320 (e.g., for generating dashboards and/or reports on a performance of one or more experiments performed on a subscriber/monitored web site using various techniques described herein). The processing performed by each of these components is further described below.

In some implementations, one or more of these functions/components can be performed by another device or function/component, such that the user context/behavior signal processing and/or the other signal processing can be performed using another device or function/component, which can provide respective input to the system. As another example implementation, various components can be implemented as a common component, such as a user context/behavior processing component that can be implemented to receive and process both behavior signals and other signals (e.g., web page performance signals). In an example implementation, the system is implemented using the Apache Solr™ open source framework, the Apache Cassandra™ database, and various other components as further described below.

In an example implementation, system 302 can be implemented to provide the system/service for providing control selection and analysis of SEO activities for web sites 102 described above with respect to FIG. 1 and FIG. 2. For example, web pages for a subscribing merchant web site (e.g., a web site that subscribes to the service for providing control selection and analysis of SEO activities for web sites 102) and performance data associated with the subscribing merchant web site can be processed using CPU 304 and RAM 306 to automatically generate a report based on one or more experiments performed on the subscribing merchant web site and accessed through a web-based dashboard by a subscribing user for the merchant web site via the user's web browser executed on the user's device (e.g., a client/computing device, such as via a web browser executed on a smart phone, laptop, computer, or other client/computing device).

Overview of a Process and a Finite State Machine Based Web Tool for Performing Control Experiments In one embodiment, new and improved techniques to provide a system/service for control selection and analysis of SEO activities for web sites are disclosed. In one embodiment, the disclosed techniques include new and improved techniques to analytically measure the Return On Investment (ROI) of SEO content improvement activities at scale, such as further described below.

In one embodiment, the disclosed techniques include a process for performing control experiments for control selection and analysis of SEO activities for web sites. For example, the process for performing control experiments for control selection and analysis of SEO activities for web sites can include setting up an A/B test of web pages on a web site (e.g., pages) for performing a control experiment. The process begins with a set of pages as input and then splits the set of pages into two representative sets of pages (e.g., a test group of pages and a control group of pages for the experiment). The pages can be canonicalized prior to being provided as input to the experiment and can be canonicalized on a continual/periodic basis (e.g., an example implementation of the canonicalization process is described further below). In this example, a list of outputs can include the following outputs as will now be described. Two groups of pages that are selected from the input set of pages and are representative in terms of a set of page features (e.g., dimensions as described further below), as mentioned above, using stratified sampling can be output. One group of pages, which is referred to as the 'test' group, is treated (e.g., modified with SEO content improvement activity) with the content improvement activity, such as by adding and/or activating one or more SEO widgets to the web page(s) in the test group (e.g., examples of commercially available SEO widgets include the various widgets available from BloomReach Inc. as similarly described above). The other group is not treated with the SEO content improvement activity and is referred to as the 'control' group. In this example, the set of page features, which are used to make the sets representative, can be extensible and can include such page features (e.g., also referred to herein as dimensions) as page type, category, and traffic/visits level. In this example, the process can also determine a set of outlier pages that are not representative and, thus, can be discarded from the set of pages to be used during the experiment (e.g., pages that do not have a comparable page in the other group, based on one or more of the page features/dimensions). In this example, the process can also perform a statistical test to evaluate an efficacy of the selection of pages for the experiment.

In one embodiment, the disclosed techniques can also include using a finite state machine-based web tool for performing the control experiments for control selection and analysis of SEO activities for web sites. In an example implementation, the finite state machine is implemented using a web tool that can perform a variety of control experiments for control selection and analysis of SEO activities for web sites that can execute automatically (e.g., after just a few manual operations/user inputs to configure the experiment, such as described below). In this example, the web tool has the flexibility to support a variety of operations related to control experiments, such as will now be described. The web tool can perform various types of control experiments: (a) when widgets are turned on on URLs (e.g., when one or more SEO widgets on a web page in the test group of pages are activated/turned on, which can also include adding such SEO widget(s) to the web page, such as a newly discovered page/URL or a newly added page/URL to the experiment); (b) when widgets are turned off of URLs (e.g., when one or more SEO widgets on a web page in the test group of pages are deactivated/turned off); and (c) when widgets are turned off of URLs and then turned back on. The web tool can manage experiments: (a) start experiments; and (b) stop experiments. The web tool can manage URLs (e.g., web pages that are selected for use in the experiment): (a) save URLs for future experiments; and (b) launch on newly discovered URLs.

In one embodiment, ROI is calculated by tracking the visits (e.g., tracking user activity, including user visits, such as similarly described above using various user behavior monitoring and tracking techniques) to the test group over and above the visits to the control group, which is referred to herein as lift (e.g., the increased user visit activity associated with the test pages that have the SEO content improvement activity, such as using an activated widget(s), is inferred to indicate an increase or lift in user activity based on the comparison with the control group of pages). In an example implementation, an incremental visits value (e.g., the incremental visits value can be calculated by determining [visits to test pages] subtracted by [visits to control pages] during a period of time that the experiment is performed) can be multiplied by the revenue per visit of the test group to calculate the incremental revenue (e.g., the increase in revenue that can be associated with the test pages that have the SEO content improvement activity, such as using an activated widget(s), based on the comparison with the control group of pages). In an example implementation, a statistical significance of the lift can also be calculated as further described below.

A more detailed discussion of a process and finite state machine based web tool for performing control experiments for control selection and analysis of SEO activities for web sites and/or for analytically measuring the ROI of SEO content improvement activities at scale is provided below.

In one embodiment, for statistical reasons, the test and control set should generally be selected such that they are very similar with respect to selected dimensions, such as page type distribution, category/department distribution, and/or traffic/visits distribution using a stratified sampling technique. For example, the process of selecting pages and determining outlier pages can be implemented to verify that there is an equal probability of finding a category or a product page in either set to ensure that any bias in the test or control set (e.g., test group of pages or control group of pages) is eliminated and/or at least reduced/mitigated. Similarly, the process of selecting pages and determining outlier pages can be implemented to verify that the test and control sets are generally selected such that the traffic distribution is similar across both sets and that there is an equal amount (e.g., approximately equal amount) of representation from different categories/departments in both sets.

For example, uniform random sampling can work optimally if the size of the candidate pages as well as the size of any subset of the candidate pages (e.g., when aggregated by any attribute or a set of attributes) are large. However, this condition may not hold in the case of selection of pages that receive Internet traffic, and in such cases, stratified sampling can be performed as described below.

An example implementation of the processing for performing control experiments will now be described.

Canonicalization of Web Pages for the Experiment(s)

In one embodiment, the available pages undergo a process called canonicalization prior to control selection as well as ongoing over the duration of the experiment (e.g., the canonicalization of the selected pages for the two sets for the experiment can be performed periodically/continuously to verify that the pages in the two sets (test set and control set) satisfy the dimensions and/or other criteria, such as for outlier determinations, as described herein).

In an example implementation, the canonicalization process is performed as will now be described. Pages with HTTP errors, such as HTTP Error 400 Bad Request and HTTP Error 500 Internal Server Error, are removed from the two sets (e.g., test set and control set). Pages with redirects, such as pages that redirect with HTTP codes 301 and 302, have their visits (e.g., user visits) accounted for correctly (e.g., an example of this type of redirect can occur when a page for a discontinued product redirects to a parent category page). Pages that are no longer available for crawling by search engines (e.g., through the robots.txt disallow directive) are also removed from the two sets. Pages that have changes in rel canonical tag (e.g., rel="canonical" link tag) have their visits accounted for correctly. Pages that are not indexed on the web site (e.g., pages that get a "noindex" tag) are removed from the two sets. Pages could change portions of their URL. In some cases, there is a unique identifier in the URL and in other cases there is not. Both cases can be addressed during the canonicalization process. For example, the canonicalization process can include one or more (or all) of the above-described operations to canonicalize a set on input pages for test/control sets for an experiment.

In an example implementation, an input to the experiment for selection of pages for use in the experiment will now be described. The input includes a set of candidate pages that meet the following conditions: (1) pages are canonical (e.g., the pages have been canonicalized, such by performing one or more (or all) of the operations of the canonicalization process as described above); and (2) pages are active (e.g., the pages are active/accessible/live on the web site). For each page, the input includes a set of attributes, such as page type, breadcrumb/department, and organic search visits. The output is to split the candidate set of pages into test and control sets. As an example, the split of the candidate set of pages into test and control sets can be performed such that 2<=k<=3 where k=|test|/|control|.

In an example implementation, the process for selecting pages (e.g., the canonicalized pages) for each of the test set and the control set for use in the experiment can generally be implemented as will now be described. Build Cartesian products of the following features: Traffic Bucket×Page Type×Breadcrumb/Department (e.g., additional and/or different features can also be included). Assign each page to a bucket defined by the Cartesian product as described above. Discard buckets that have less than a threshold number of pages (e.g., a threshold number of pages can be five or a greater number of pages, or another threshold value can be used for bucket sizes). Iterate through all buckets. The number of URLs in that bucket can be referred to as $N_i$. Pick C/100*$N_i$ random URLs into the control set, and the rest into the test set. If C/100*$N_i$ is not an integer, then it can be rounded up or down probabilistically on the value of the fraction. For example, in order to pick out a set of K random URLs from a larger set of cardinal P, the sampling method can use memory in order of K (e.g., reservoir sampling) not in order of P (e.g., shuffling the list, and pick the first K). For each bucket, further split the set of URLs by traffic visits in the last threshold number of days (e.g., a threshold number of days can be seven, or another threshold value can be used for the number of days). Choose bin size using log-scale (i.e., 0 visits, 1-10 visits, 10-100 visits). Randomly split each bucket after splitting by traffic into test and control sets using a biased coin flip with probability of heads, p=1/(k+1) (e.g., when the coin flip is heads, assign the page to control, or vice versa).

In an example implementation, an output to the experiment for selection of pages for use in the experiment will now be described. The output includes: (1) a list of test pages; (2) a list of control pages that is representative of the test pages (e.g., comparable based on selected dimensions); (3) a list of pages that were not to be selected for use in the test or control sets, because such pages were not representative; and (4) an evaluation of the efficacy of the selection. An evaluation of the efficacy of the selection of pages for use in the experiment will now be described below.

Evaluation of Efficacy of the Selection of Web Pages for Use in the Experiment

Example evaluation metrics to evaluate the efficacy of the split of selected pages for the test and control sets for use in the experiment will now be discussed. For example, various evaluation metrics can be used to verify that the split of selected pages (e.g., the canonicalized pages) for the test and control sets for use in the experiment ensures that the distribution of test/control sets is fair, as further discussed below. An example of two different evaluation metrics includes the following: (1) distribution by number of pages; and (2) traffic distribution.

The distribution by number of pages metric will now be discussed. The distribution by number of pages metric generally seeks to quantify the following: "How different is the test and control distribution by the number of pages?" Let {A1, A2, ..., An} be the set of all attributes except traffic visits and T(A1, A2, ..., An), C(A1, A2, ..., An) be the set of test and control pages bucketed by attributes A1, A2, ..., An. Note that for all possible attribute values, ideally, it is desired that T(A1, A2, ..., An)/C(A1, A2, ..., An)=k. As such, an example for calculating the number of pages metric is shown below.

$$\Omega_1(T, C) = \sum \frac{|T(A_1, A_2, \ldots, A_n)| + |C(A_1, A_2, \ldots, A_n)|}{N} \left( \frac{|T(A_1, A_2, \ldots, A_n)|}{|C(A_1, A_2, \ldots, A_n)|} - k \right)^2$$

Note that $\omega_1 >= 0$ and the lower the value, then the better is the split based on this evaluation metric.

The traffic distribution metric will now be discussed. The traffic distribution metric generally seeks to quantify the following: "How similar is the traffic distribution between test and control when aggregated by different attributes?" Let E(T(A1, A2, ..., An)) and E(C(A1, A2, ..., An)) denote the average visits of test and control pages when aggregated by the attribute set (A1, A2, ..., An). As such, an example for calculating the traffic distribution metric is shown below.

$$\Omega_2(T, C) = \sum \frac{|T(A_1, A_2, \ldots, A_n)| + |C(A_1, A_2, \ldots, A_n)|)}{N} (E(T(A_1, A_2, \ldots, A_n)) - E(C(A_1, A_2, \ldots, A_n)))^2$$

Note that $\Omega_2 >= 0$ and the lower the value, then the better is the split based on this evaluation metric.

Figure 9:
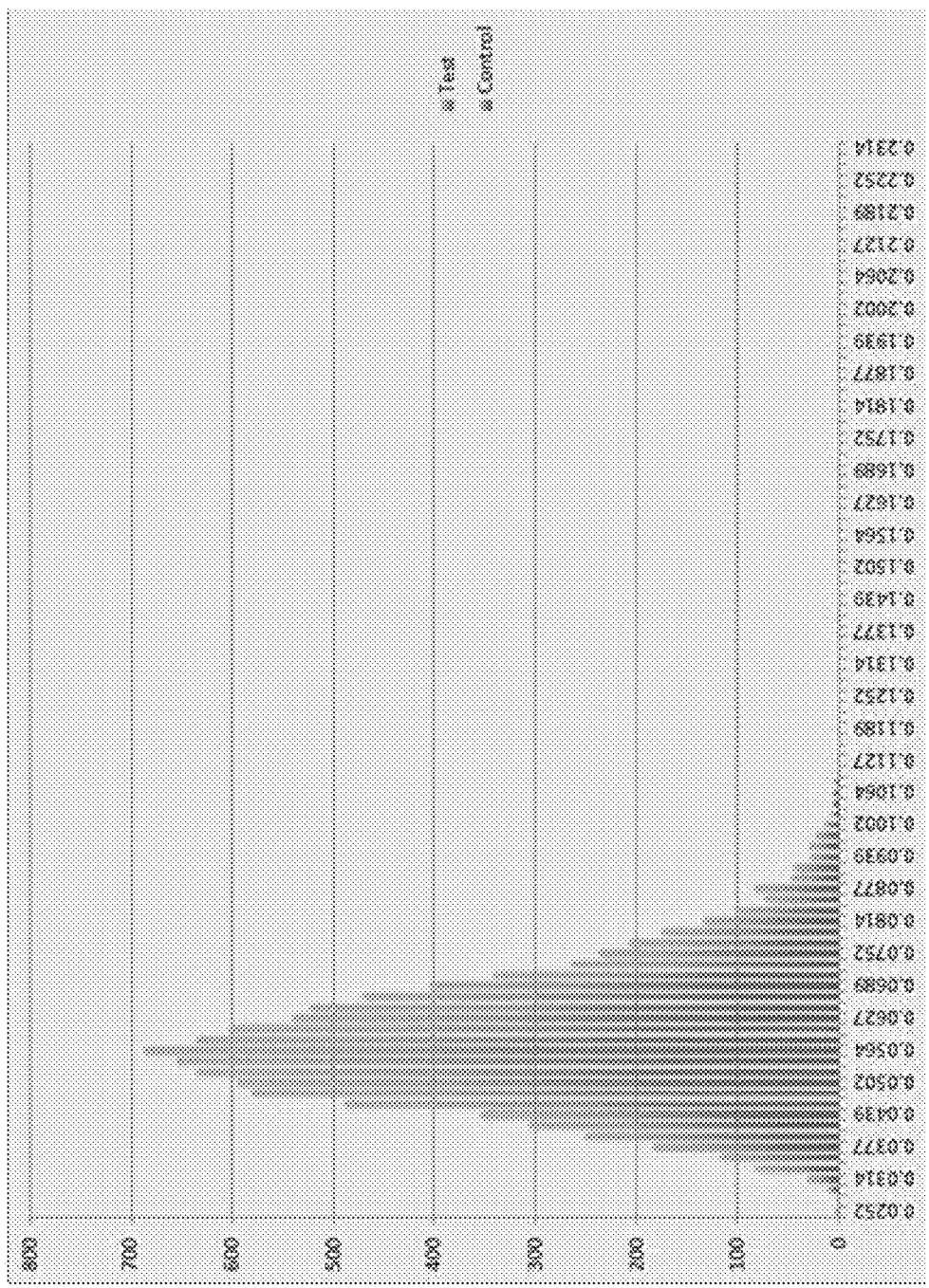
FIG. 9 is a chart diagram that illustrates how the visits/page in a test group at the start of an experiment are similarly distributed as the visits/page going to a control group at the start of the experiment in accordance with some embodiments.

An illustration of how similar the traffic distribution between example test and control sets is shown in FIG. 9. FIG. 9 illustrates how the visits to pages in the test group at the start of the experiment are similarly distributed as the visits to pages in the control group at the start of the experiment, as further described below.

Overview of a Finite State Machine Based Web Tool

Finite State Machine for Individual URLs

Figure 4:
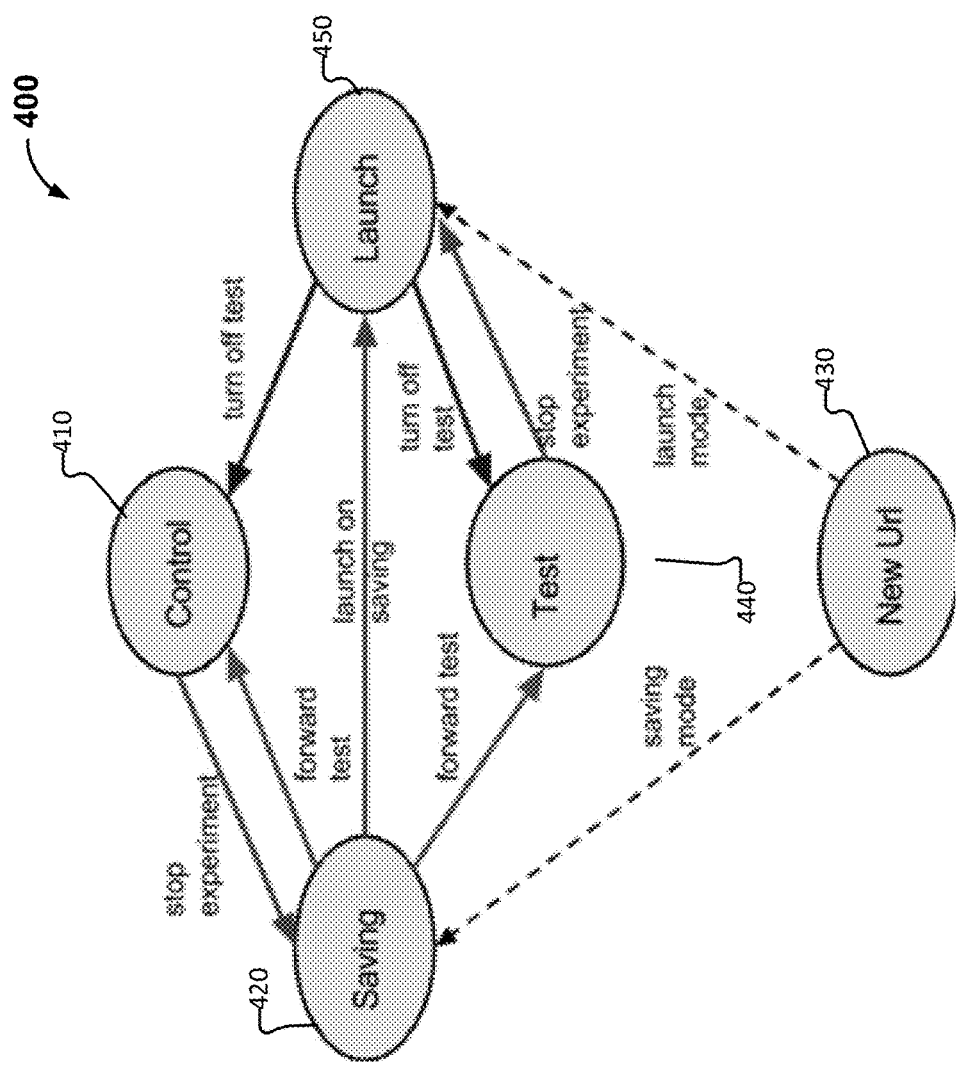
FIG. 4 illustrates a finite state machine based web tool for individual URL states in accordance with some embodiments.

FIG. 4 illustrates a finites state machine based web tool for individual URL states in accordance with some embodiments. In particular, FIG. 4 illustrates a finite state machine based web tool 400 that includes different states for individual URLs (e.g., pages) of a merchant web site using the above-described process for control experiments and finite state machine in accordance with some embodiments.

As shown in FIG. 4, finite state machine based web tool 400 includes a control state 410, a saving state 420, a new URL state 430, a test state 440, and a launch state 450. Each of these states and transitions between such states will be further described below.

For example, a finite state machine can be used to capture the state of a URL and the state of a merchant as well as the allowed actions that can be done when the URL or the merchant is in a particular state. In an example implementation, the states of the URL and the merchant and the allowed actions can be visualized in a web tool as described herein. For example, using the disclosed finite state machine based web tool, states of merchants and URLs can be tracked and actions that can be performed are clearly defined. In particular, this visualization helps non-technical or business people understand URL and merchant states and the possible actions such as the following actions as will now be described.

An example action can be to run/launch various types of control experiments (e.g., also referred to as experiments), such as: (a) when widgets are turned on on URLs; (b) when widgets are turned off on URLs; and (c) when widgets are turned off on URLs and then turned back on. Another example action can be to manage experiments: (a) start experiments; and (b) stop experiments. Another example action can be to manage URLs: (a) save URLs for future experiments; and (b) launch on newly discovered URLs.

A more detailed description of the finite state machine for individual URLs is provided below, starting with the states and then the actions of the finite state machine in this example implementation. In this example, a page can have a finite set of states as will now be described. The new URL state (430) is the state of a page that has just recently been discovered. The test state (440) is the state of a page that is targeted (e.g., the page includes one or more SEO widgets launched on it without any experiment). The control state (410) is the state of a page that is in the control set of an experiment. The saving state (420) is the state of a page that is saved for the next experiment. The launched state (450) is the state of a page that is targeted and in a test/experiment (e.g., the page includes one or more SEO widgets launched on it in an experiment). As will now be apparent, additional and/or different states can be implemented using the finite state machine based web tool for merchant states.

Finite State Machine for Merchant States

Figure 5:
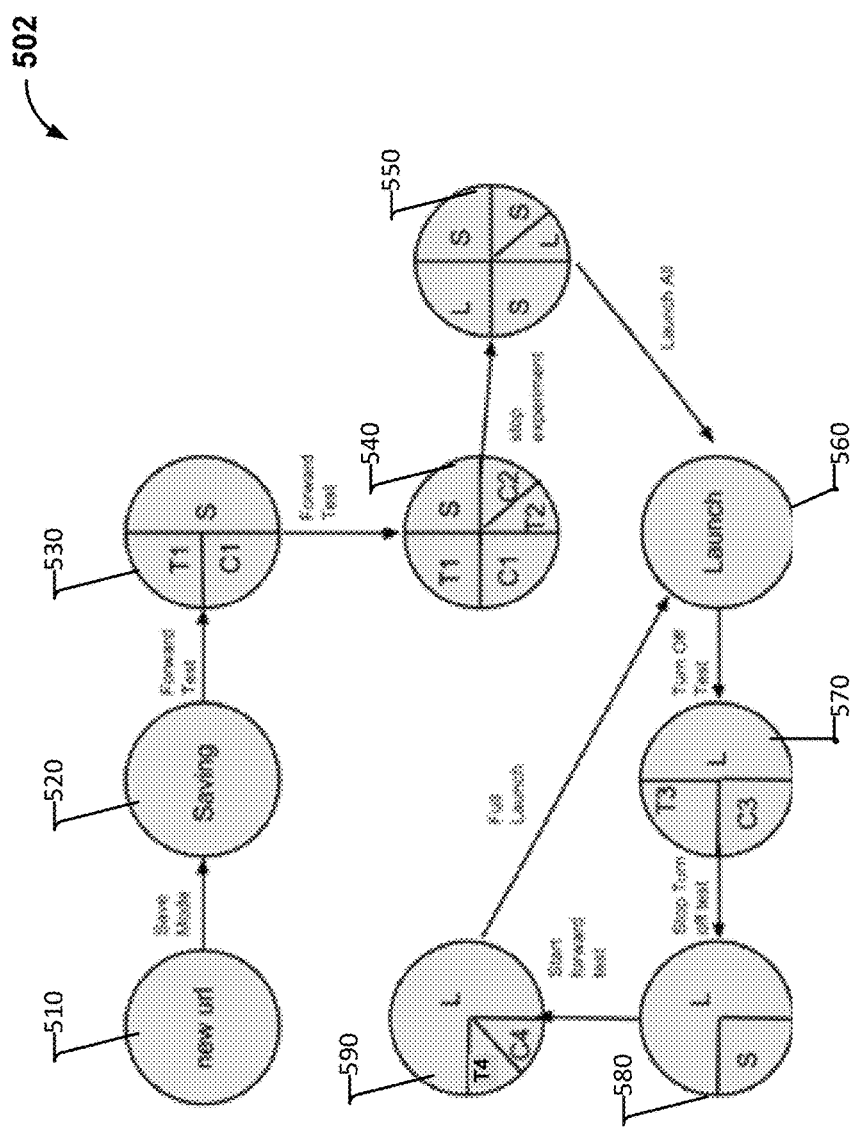
FIG. 5 illustrates a finite state machine based web tool for merchant states in accordance with some embodiments.

FIG. 5 illustrates a finite state machine based web tool for merchant states in accordance with some embodiments. In particular, FIG. 5 illustrates a finite state machine based web tool 502 that includes different merchant states for URL distribution using the above-described process for control experiments and finite state machine in accordance with some embodiments.

As shown in FIG. 5, finite state machine based web tool 502 includes a new URL(s) state 510, a saving state 520, and a launch all test(s) state 560. A new URL(s) first enters into a saving state 520 and then when a Forward Test action is completed; it can enter into a test state or control state 530. A new test/control set (T2/C2) state 540 can also be generated. An experiment can be stopped 550. Some portion of the URLs in launch state can be turned off to do a turn-off test 570. The turn-off test can be stopped 580, and another forward test can be started 590. Each of these states and transitions between such states will be further described below.

A more detailed description of the finite state machine for URL distribution is provided below, starting with the states and then the actions of the finite state machine in this example implementation. In this example implementation, a merchant can have a finite set of states as will now be described. The new URL(s) state (510) is the state of a merchant that is a new merchant and all URLs will be labeled as new. The saving state (520) is the state of a merchant that indicates that all new discovered pages are collected and will be labeled as in the saving state. For example, these URLs will not be launched on unless an experiment is run, or the merchant is moved to a full launch state. The full launch state (560) is the state of a merchant that indicates that all discovered pages, all saving pages (e.g., shown with a letter indicator of "S" in FIG. 5), and all control pages (e.g., shown with a letter indicator of "C" (or C#, such as C1, C2, C3, or C4) in FIG. 5) will be launched. In this example, all test pages (e.g., shown with a letter indicator of "T" (or T#, such as T1, T2, T3, or T4) in FIG. 5) will be relabeled as launched pages (e.g., shown with a letter indicator of "L" in FIG. 5).

In this example, a merchant can perform a variety of different actions as will now be described.

Going Forward Experiment Action (e.g., shown as Forward Test in FIG. 5) is an action that can be performed to start a control experiment when widgets are turned on on URLs that are in the saving state. For example, the user can specify a control ratio to be generated from saving pages. The above-described process for control experiments can generate the test URL set and the control URL set. In this example, a summary of a number of pages, traffic for the test URL set and control URL set for each experiment and for the combined test will be reported.

Turn Off Experiment Action (e.g., shown as Stop Experiment in FIG. 5) is an action that can be performed to start a control experiment when widgets are turned off of URLs. For example, the user can specify a control ratio to be generated from launched URLs. The above-described process for control experiments can generate the test URL set and the control URL set. In this example, a summary of a number of pages, traffic for the test URL set and control URL set for each experiment and for the combined test will be reported.

Release Experiment Action is an action that is performed when a user specifies the experiment they want to release. For example, all control URLs from that experiment will go to the saving state, and all test URLs from that experiment will go to the launch state.

Reset Action is an action that is performed when a user specifies to reset all pages of the merchant back to the saving state. In this case, this merchant will be considered as new (e.g., reset to the new URL state as similarly described above).

As will now be apparent, additional and/or different states can be implemented using the finite state machine based web tool for merchant states.

In this example implementation, the ROI of SEO improvement activity based on the control experiment(s) can be calculated as will now be described in more detail below.

ROI Calculation and Statistical Significance

ROI Calculation

In one embodiment, the ROI of SEO improvement activity based on the control experiment(s) can be calculated as shown below.

Figure 10:
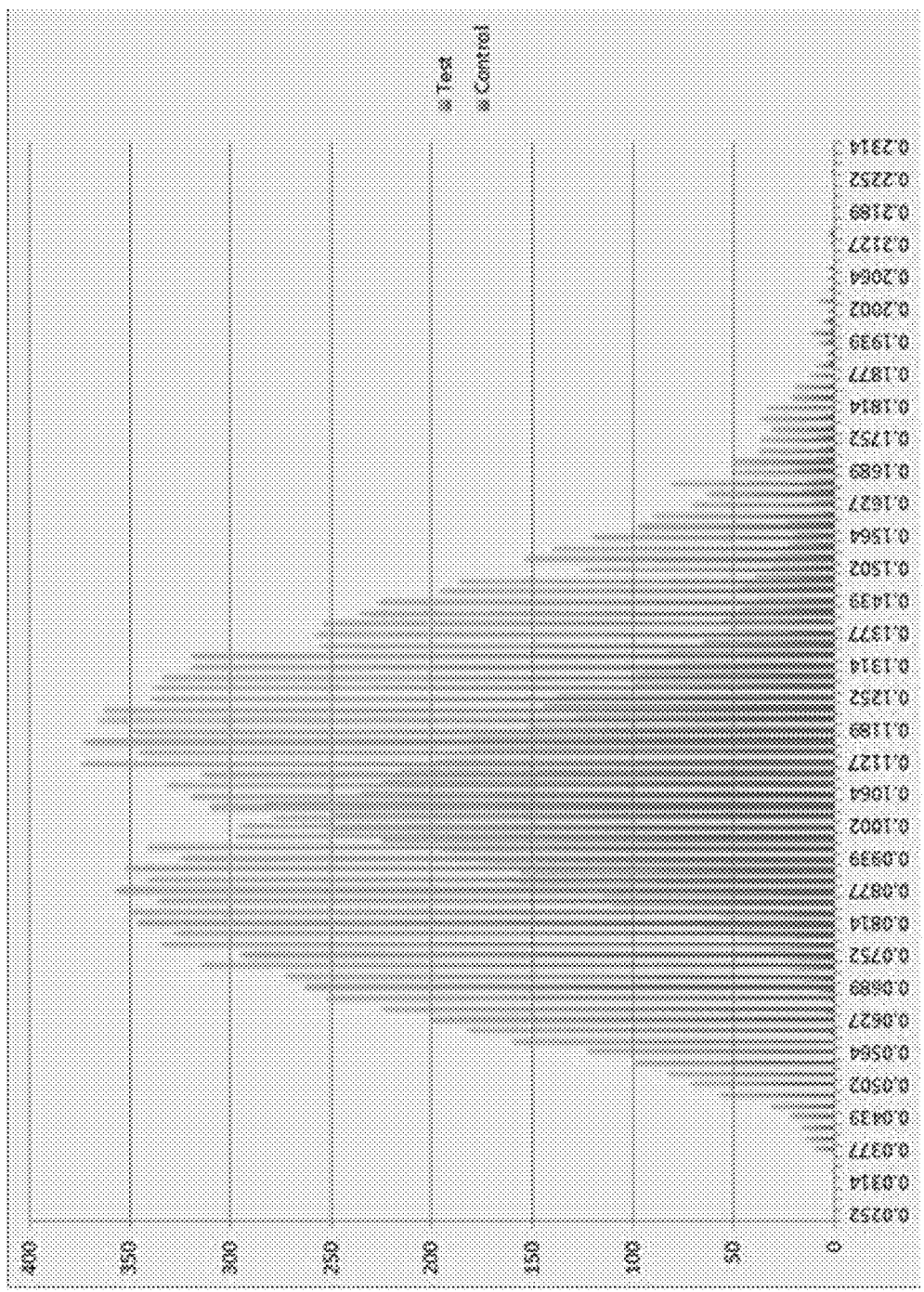
FIG. 10 is a chart diagram that illustrates how the distribution of visits/page to the test group at the end of an experiment has increased relative to the distribution of visits to the control group in accordance with some embodiments.
Figure 11:
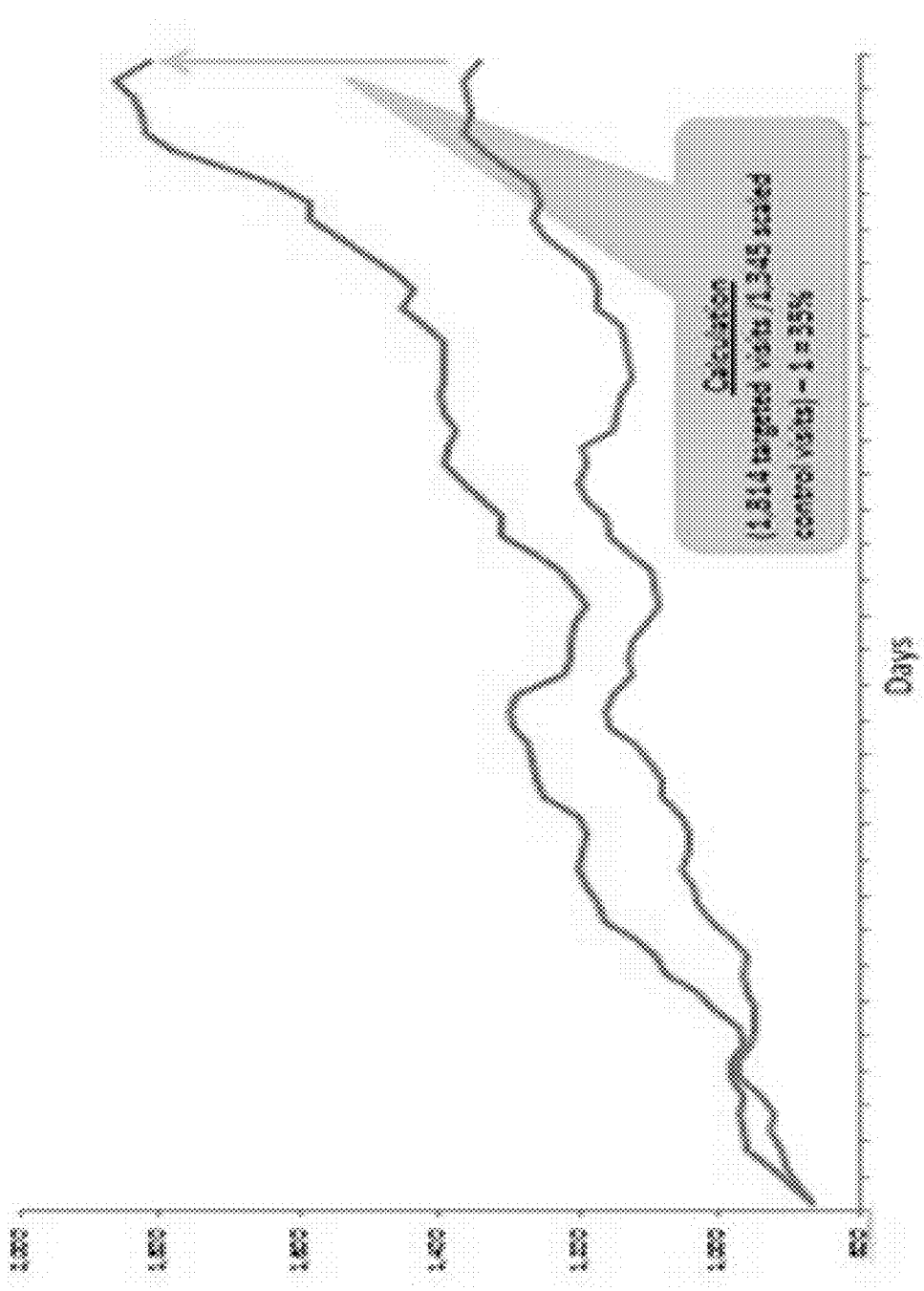
FIG. 11 is a chart diagram that illustrates how the visits to the test group and the visits to the control group are tracked over time in accordance with some embodiments.

ROI=Incremental revenue resulting from content improvement activity/Cost of this activity Incremental revenue=Incremental visits resulting from this activity×Revenue Per Visit Incremental visits=Lift in visits to Test group over Control×Visit level Lift=Test visits/(Control visits×Scaling)−1 where visits are as of the date Scaling=Test visits/Control visits as of the day the content improvement goes live In one embodiment, lift is illustrated in FIG. 10 and FIG. 11. FIG. 10 illustrates how the distribution of visits to the test group at the end of the experiment has increased relative to the distribution of visits to the control group, as further described below. FIG. 11 illustrates how the visits to the test group and the visits to the control group are tracked over time to calculate lift, as further described below.

Outlier Analysis

In one embodiment, an outlier analysis is performed to modify and/or verify a selection of web pages selected for the control group and for the test group (e.g., the outlier analysis process can be performed before, during, and/or after one or more experiments using the control/test groups). For example, outliers can be found at the time of control selection or in the duration of the experiment. These outliers can be automatically excluded from the analysis (e.g., excluded from the experiment and/or subsequent experiment(s)). In this example, during control selection, any URLs that are not representative can be marked as outliers and not included in the analysis. Also, in this example, the canonicalization process (e.g., as described above) can also be applied on an ongoing basis. For example, site changes such as redirects, canonical changes, and/or error pages can be automatically removed from the control/test groups. In addition, in this example, outliers resulting from unusual traffic change are determined by applying certain automatic methodologies such as percentage of total test (or control) traffic or percentage of contribution to the change in traffic, and variance in traffic for a trailing N number of days.

Statistical Significance

Figure 12:
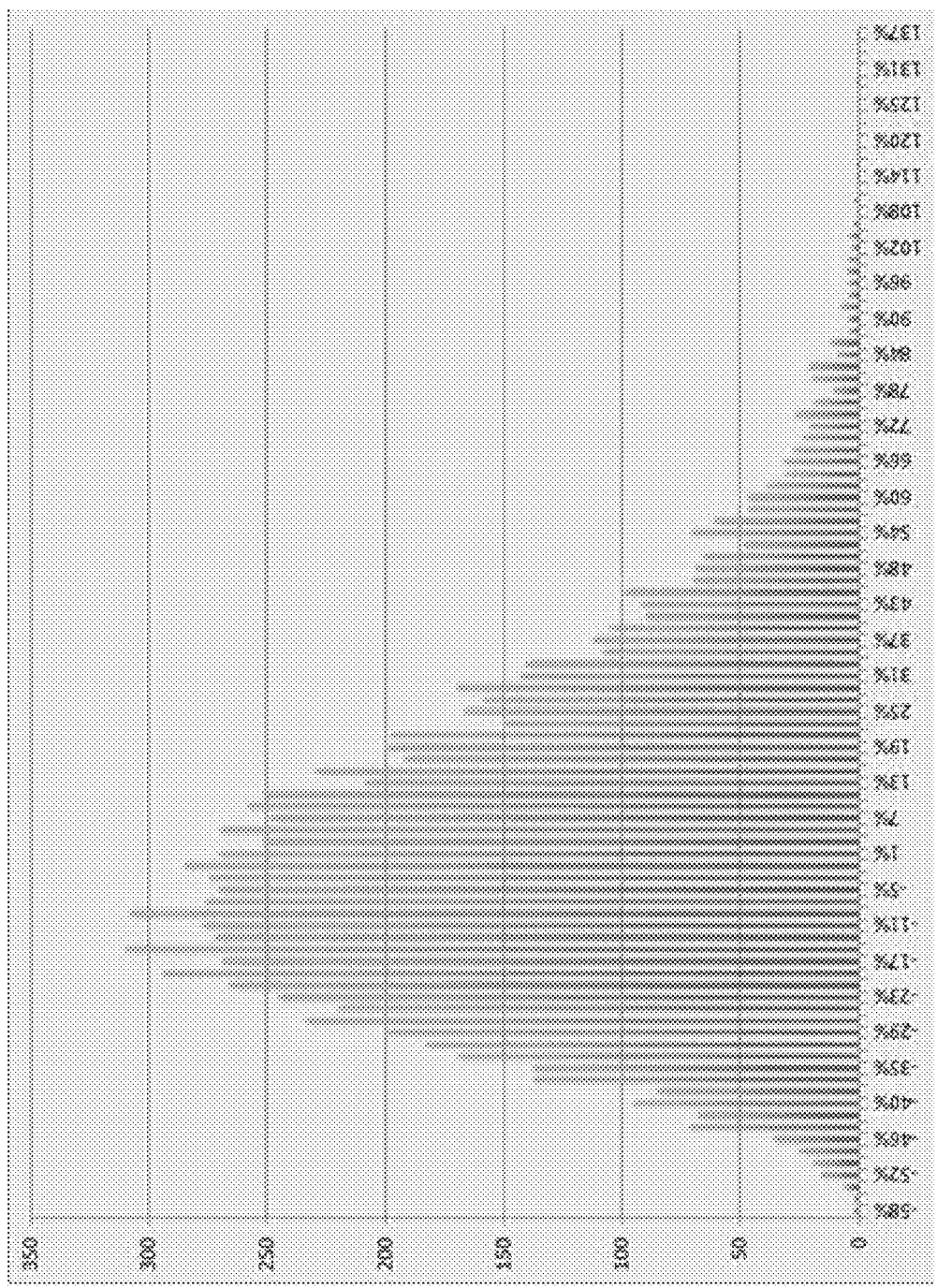
FIG. 12 is a chart diagram that illustrates a Monte Carlo based permutation test in accordance with some embodiments.

For example, the statistical significance of the incremental uplift can be computed to show that the lift in traffic to test pages is due to the widgets (e.g., SEO widgets on the test pages) and not by random chance. In order to determine such statistical significance, Monte Carlo based permutation tests can be used. FIG. 12 illustrates the output of a Monte Carlo based permutation test, as further described below.

An example of how to apply such Monte Carlo based permutation tests to determine the statistical significance of the incremental uplift can be computed to show that the lift in traffic to test pages is due to the widgets will now be described. Specifically, calculate the visits per page of the two groups (e.g., the test and control groups/sets) and then determine to what extent this statistic is special by seeing how likely it would be if the test and control pages had been jumbled.

Let the number of test and control pages be $N_t$ and $N_c$. In Monte-Carlo based permutation tests, the test and control pages can be grouped together into one bucket and randomly retrieve $N_t$ pages from the pooled group and classify them as test pages and the rest as control pages. The lift can then be computed with the randomly modified test and control set of pages. This experiment can be repeated a large number of times (e.g., 10,000 or more times), which provides the empirical lift distribution. In order to test for statistical significance, at what percentile value of the empirical lift distribution the originally observed lift in traffic is can be checked.

When running Monte Carlo permutation tests, the test and control pages can be grouped into a single bucket and then randomly select a set of pages for the test and control groups. The lift can then be computed between these randomly modified test and control sets of pages in a large number of trials (e.g., 10,000 or more trials). If the lift measured in the original test set is truly significant, then a lift of approximately 0% would generally be expected (e.g., <a threshold percentage of lift, such as less than 1% or some other threshold value) in these randomly selected test and control sets.

Accordingly, the disclosed techniques can be applied to solve the problem of measuring ROI of SEO content improvement activities at scale for web sites for web service providers. For example, the disclosed techniques provide a new and improved solution that addresses the problem of measuring ROI of SEO content improvement activities at scale in the following ways as described below.

The disclosed techniques provide a statistically significant measurement of lift in traffic and revenue due to SEO content improvement activities by splitting pages into representative groups. For example, the disclosed techniques can be applied to measure how many more users will enter the site as a result of SEO improvement activities, unlike A/B testing of users which measures how the content affects users who are already on the site. As another example, the disclosed techniques can also satisfy the search engine crawler requirement that the same content be shown to the crawler as is shown to users.

Also, the disclosed techniques do not critically depend on changes in the search engine's algorithm and the search engine's results page. These two are assumed to have similar influences on the two groups of URLs.

In addition, changes in the online marketing competitive landscape (e.g., people shopping directly on Amazon) and user behaviors (e.g., a shift from desktop to mobile devices) are also assumed to have similar influences on the two groups of URLs.

Further, the scope of SEO improvement activities as described herein is of the type that is not site-wide and not page specific.

Furthermore, the disclosed techniques can measure the impact of just the content improvement activity on the current traffic to just the pages that are treated with the content improvement (e.g., just the pages that have the activated/turned on SEO widgets). While it assumes that outside influences have similar influences on both groups, the outlier analysis will generally ameliorate impact from non-uniform influences from promotions, seasonality, product inventory, or site structure. The disclosed techniques also do not depend on search engine rankings of pages for a given basket of queries. The disclosed techniques do not depend on prior years' metrics. In particular, for representativeness, current traffic is used; and for lift measurement, current traffic is used.

Figure 6:
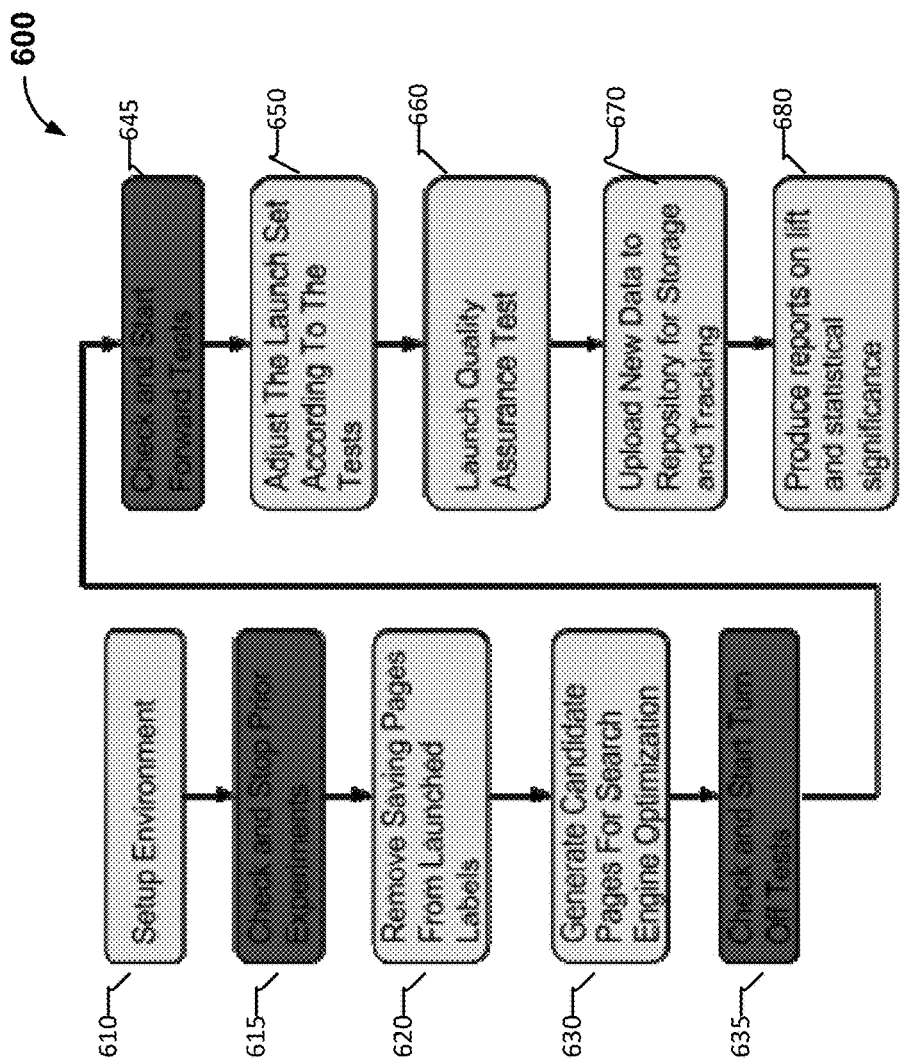
FIG. 6 is a functional block diagram that shows components of a data pipeline for performing a process and finite state machine for control selection and ROI analysis at scale of SEO improvement activities in accordance with some embodiments.

FIG. 6 is a functional block diagram that shows components of a data pipeline for performing a process and finite state machine for control selection and ROI analysis at scale of SEO improvement activities in accordance with some embodiments. For example, FIG. 6 shows various components of a data pipeline 600, which can be executed on one or multiple machines (e.g., executed on server class hardware, such as using Amazon Web Services™ (AWS) or other cloud service data center providers).

In one embodiment, the components shown in FIG. 6 perform the actions as similarly described above with respect to FIGS. 4 and 5. Referring to FIG. 6, the components shown at 615, 635, and 645 describe the sub-components of the control selection module.

As shown in FIG. 6, a setup environment component 610 is provided for setting up the environment for performing experiments on one or more web sites for web service providers using various techniques described herein. A check and stop prior experiments component 615 is provided using various techniques described herein. A remove saving pages from launched labels component 620 is provided using various techniques described herein. A generate candidate pages for search engine optimization component 630 is provided using various techniques described herein. A check and start turn off tests component 635 is provided using various techniques described herein. A check and start forward tests component 645 is provided using various techniques described herein. An adjust the launch set according to the tests component 650 is provided using various techniques described herein. A launch quality assurance test component 660 is provided using various techniques described herein (e.g., to verify the statistical significance of the experiment using techniques as described above). Upload new data to repository for storage and tracking component 670 is provided using various techniques described herein (e.g., to fetch new URLs and/or merchant product feed data as well as user behavior data, such as similarly described above with respect to FIGS. 1-3). A product reports on lift and statistical significance component 680 is provided using various techniques described herein (e.g., to generate reports, which can be stored for access to users of the service via reports/dashboards, such as similarly described above with respect to FIG. 3).

Example Use Case Scenarios

FIGS. 7A-7D are screen diagrams for a use case scenario illustrating a user interface generated by the system for providing control selection and analysis of SEO activities for web sites in accordance with some embodiments. In one embodiment, the user interface is generated by a system for providing control selection and analysis of SEO activities for web sites, such as described above with respect to FIGS. 1-6.

An example common use case is when a web site manager wants to add new content on the web site. Examples of such new content can be provided with the following: (1) SEO widgets, such as the commercially available BloomReach widgets, including, for example, the Related Searches widget and the Related Products widget as similarly described above; and/or (2) new product descriptions can be provided as new content. In both cases, the web site manager generally incurs costs for adding such new content and wants to know the incremental revenue and ROI of doing this activity.

Below are the steps that a user (e.g., a web site manager or other user of the web service provider, a user of the SEO provider, or other authorized user) can perform to measure incremental revenue and ROI using a user interface generated by the system for providing control selection and analysis of SEO activities for web sites in accordance with some embodiments.

Figure 7A:
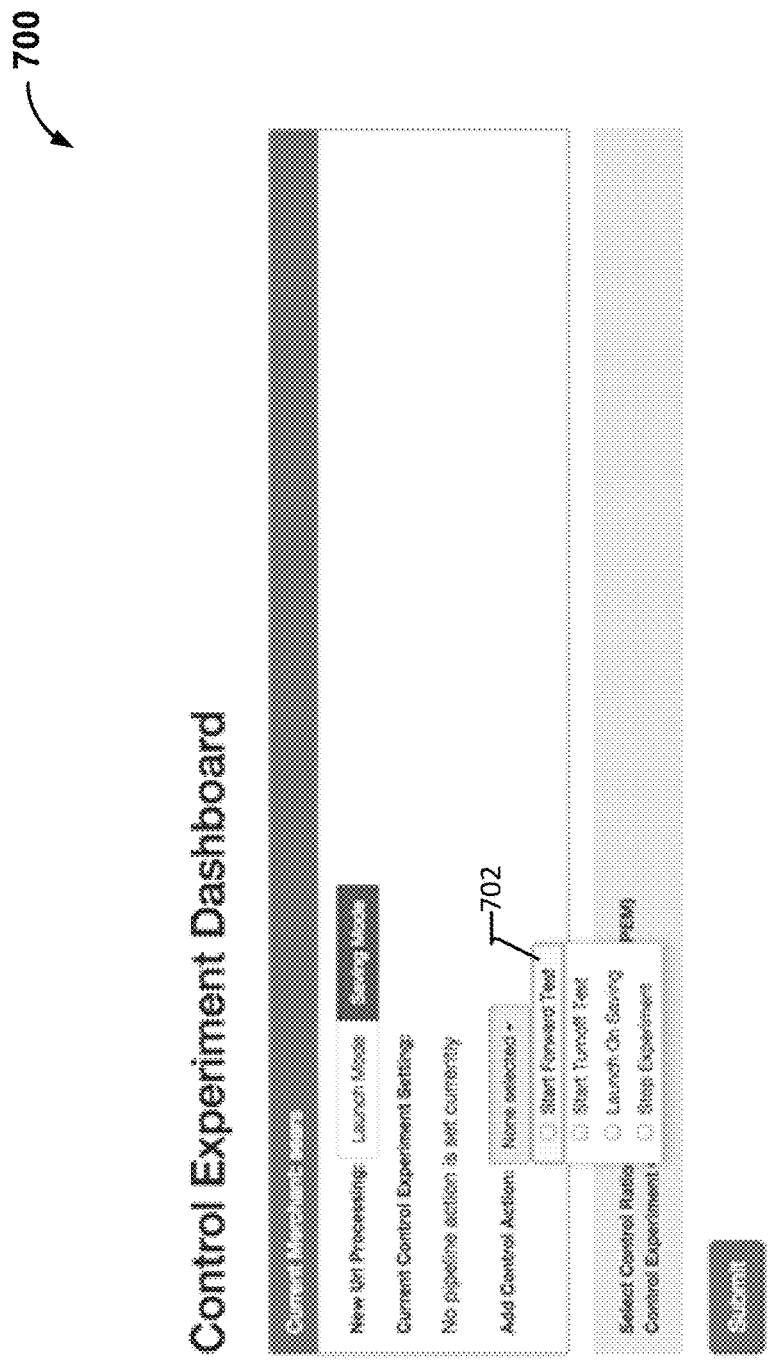
FIGS. 7A-7D are screen diagrams for a use case scenario illustrating a user interface generated by the system for providing control selection and analysis of SEO activities for web sites in accordance with some embodiments.

Referring to FIG. 7A, the user can get the test URLs and control URLs (e.g., the test pages and the control pages) to perform an experiment. For example, the user can set up an experiment in a control experiment dashboard using the Start Forward Test as shown at 702 in a screenshot 700 of the web tool as shown in FIG. 7A.

Figure 7B:
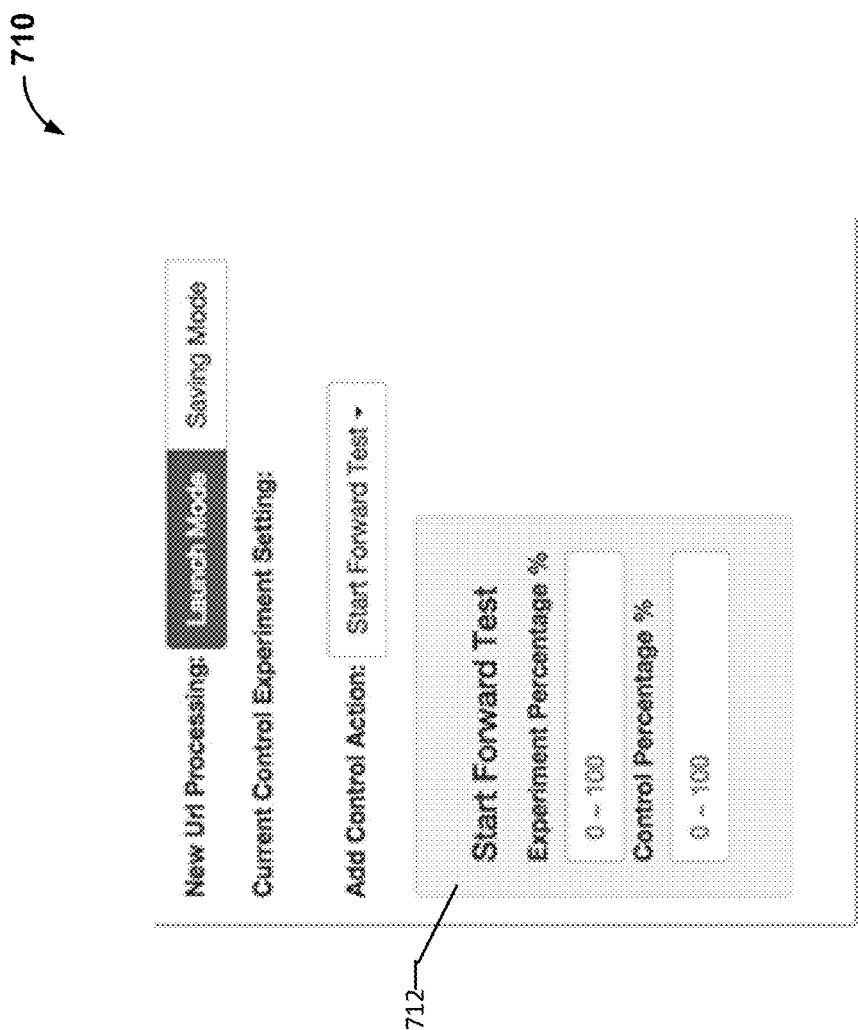

Referring to FIG. 7B, the user can then select an experiment ratio/percentage and control ratio/percentage, which can be specified as shown at 712 in a screenshot 710 of the web tool as shown in FIG. 7B. In one embodiment, the experiment ratio specifies how many of the pages are to be used in an experiment. The pages in the experiment are then further split into test and control sets/groups depending on the control ratio. As an example, suppose 100,000 pages are available and the following configuration is input by the user:experiment ratio=70%, control ratio=30%, and mode=Savings. This means that the following will be used for the experiment based on these configuration settings input by the user. Use 70% of the 100,000 pages (i.e., 70,000 pages in the experiment and save the remaining 30,000 pages). Then, take the 70,000 pages and split them in the 30% control ratio, which would result in 21,000 pages in the control group/set for the experiment (i.e., 70,000×30%=21,000), and the remaining 49,000 pages in the test group/set for the experiment (i.e., 70,000−21,000=49,000).

In the example experiment configured by the user, the disclosed system can then treat the test group/set (e.g., the test URLs) with the new content. The control group/set (e.g., the control URLs) is not treated with the new content. The disclosed system can then measure visits to the test URLs and control URLs (e.g., using commercially available or open source analytics software/tools, such as BloomReach Analytics such as similarly described above with respect to FIGS. 1-3, and/or other commercially available web analytics software/tools, such as Omniture, Coremetrics, and/or Google Analytics). The disclosed system can then calculate the lift and RPV of the test URLs over a period of time (e.g., 45-60 days or some other period of time) and from that calculate incremental revenue and ROI, such as using the techniques described above.

Figure 7C:
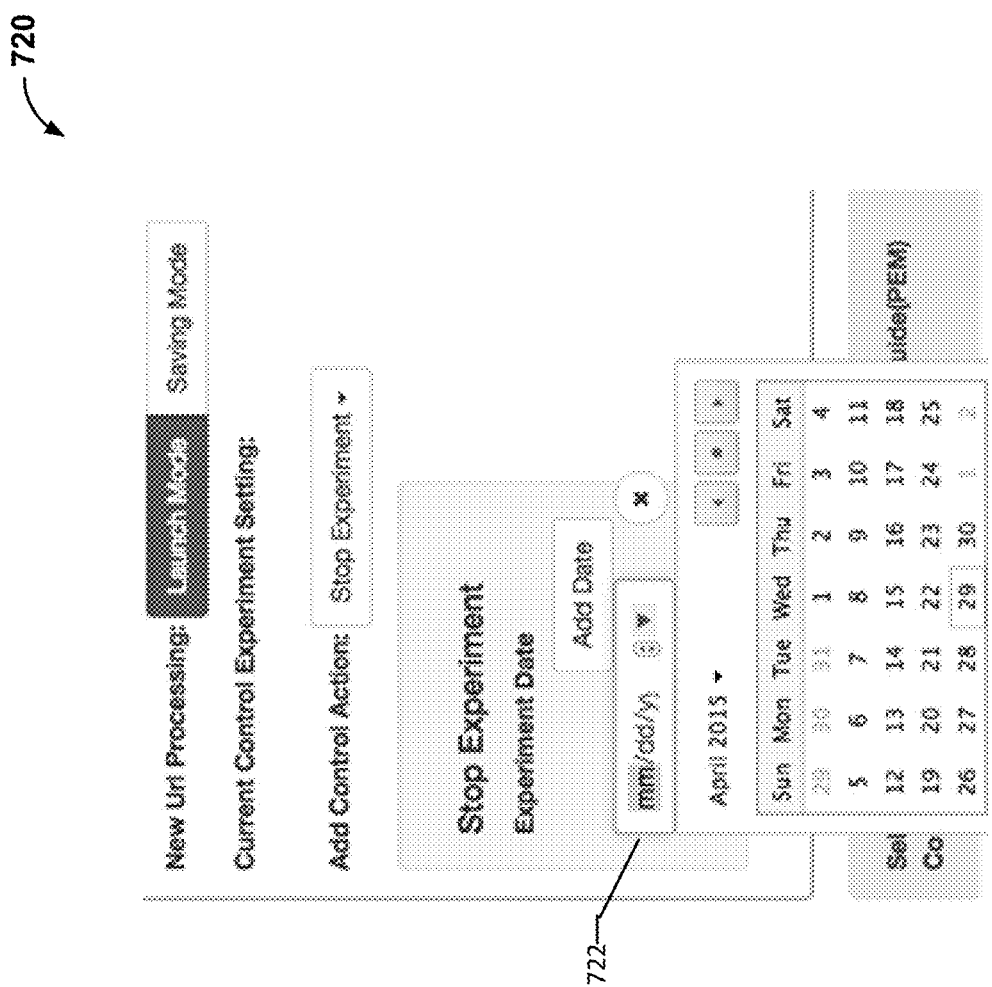

Referring to FIG. 7C, the user can stop the experiment using the web tool by specifying an end date for the experiment as shown at 722 in a screenshot 720 of the web tool as shown in FIG. 7C.

Figure 7D:
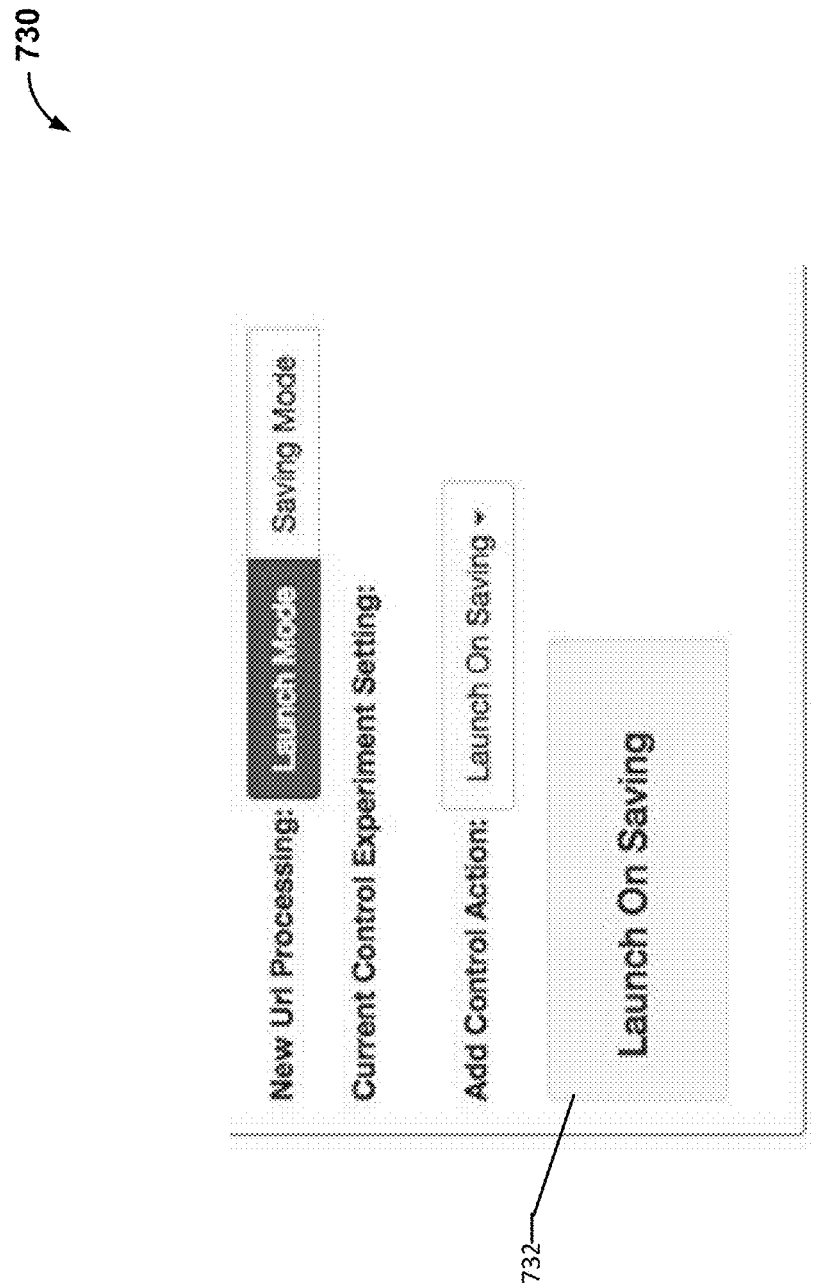

Referring to FIG. 7D, assuming ROI and incremental revenue are attractive, then the new content can be rolled out on all pages after stopping the experiment as shown at 732 in a screenshot 730 of the web tool as shown in FIG. 7D.

Figure 8:
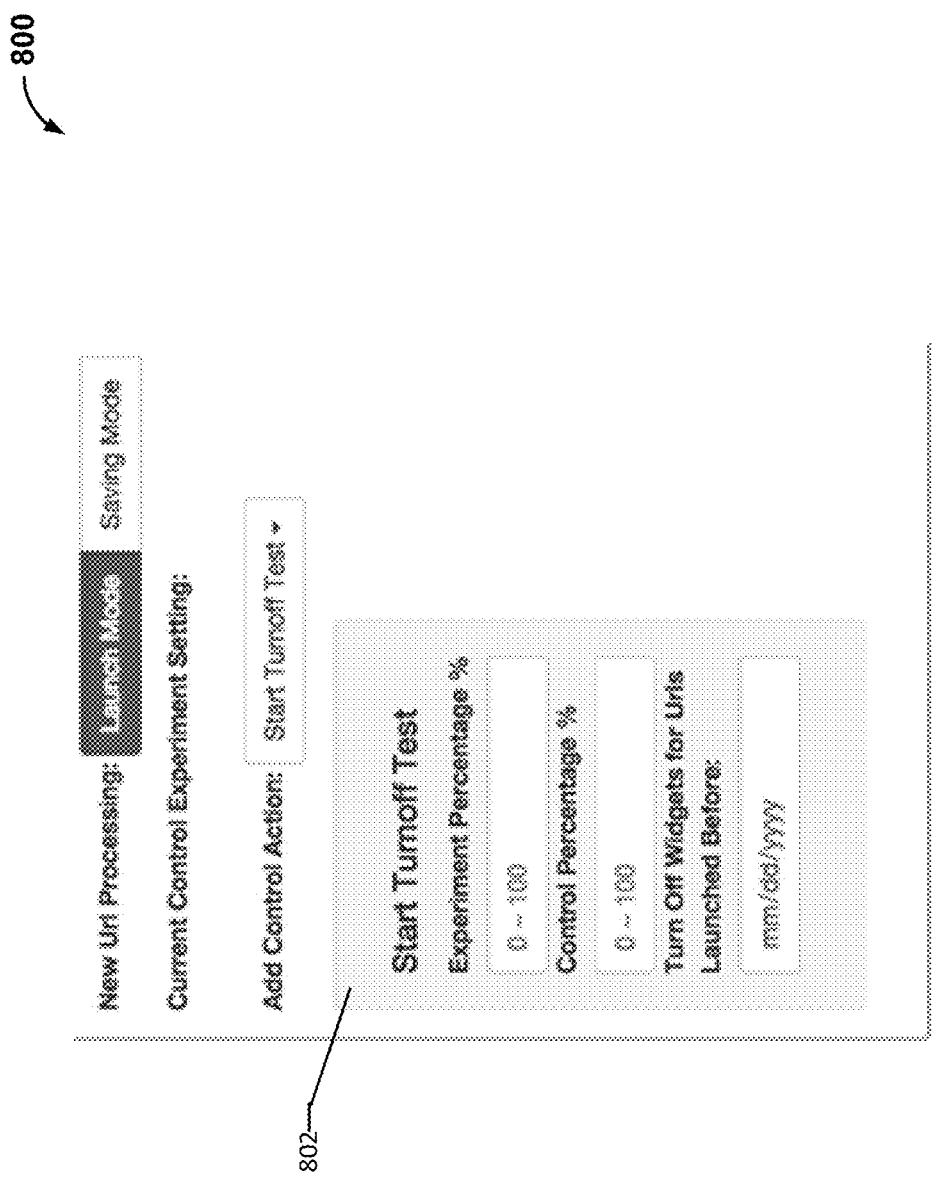
FIG. 8 is a screen diagram for another example use case scenario illustrating a user interface generated by the system for providing control selection and analysis of SEO activities for web sites in accordance with some embodiments.

FIG. 8 is a screen diagram for another example use case scenario illustrating a user interface generated by the system for providing control selection and analysis of SEO activities for web sites in accordance with some embodiments. In one embodiment, the user interface is generated by a system for providing control selection and analysis of SEO activities for web sites, such as described above with respect to FIGS. 1-6.

Referring to FIG. 8, another example use case that can be supported is measuring the impact of content being removed from some pages. For example, this can be done using a turn-off test as shown at 802 in a screenshot 800 of the web tool as shown in FIG. 8.

FIG. 9 is a chart diagram that illustrates how the visits/page in a test group at the start of an experiment are similarly distributed as the visits/page going to a control group at the start of the experiment in accordance with some embodiments. This example is a result of the control selection process as described above.

FIG. 10 is a chart diagram that illustrates how the distribution of visits/page to the test group at the end of an experiment has increased relative to the distribution of visits to the control group in accordance with some embodiments. The increase in the average of each of the distributions is a measure of the lift that is observed in the test group over the control group.

FIG. 11 is a chart diagram that illustrates how the visits to the test group and the visits to the control group are tracked over time in accordance with some embodiments. For example, FIG. 11 also illustrates how the lift in test visits over the control visits can be calculated.

FIG. 12 is a chart diagram that illustrates a Monte Carlo based permutation test in accordance with some embodiments. For example, the statistical significance of the incremental uplift can be computed to show that the lift in traffic to test pages is due to the SEO activity associated with the test pages (e.g., SEO widgets on the test pages) and not by random chance. In order to determine such statistical significance, Monte Carlo based permutation tests can be performed using various techniques as similarly described above. As shown, FIG. 12 illustrates an example output of a Monte Carlo based permutation test.

Figure 13:
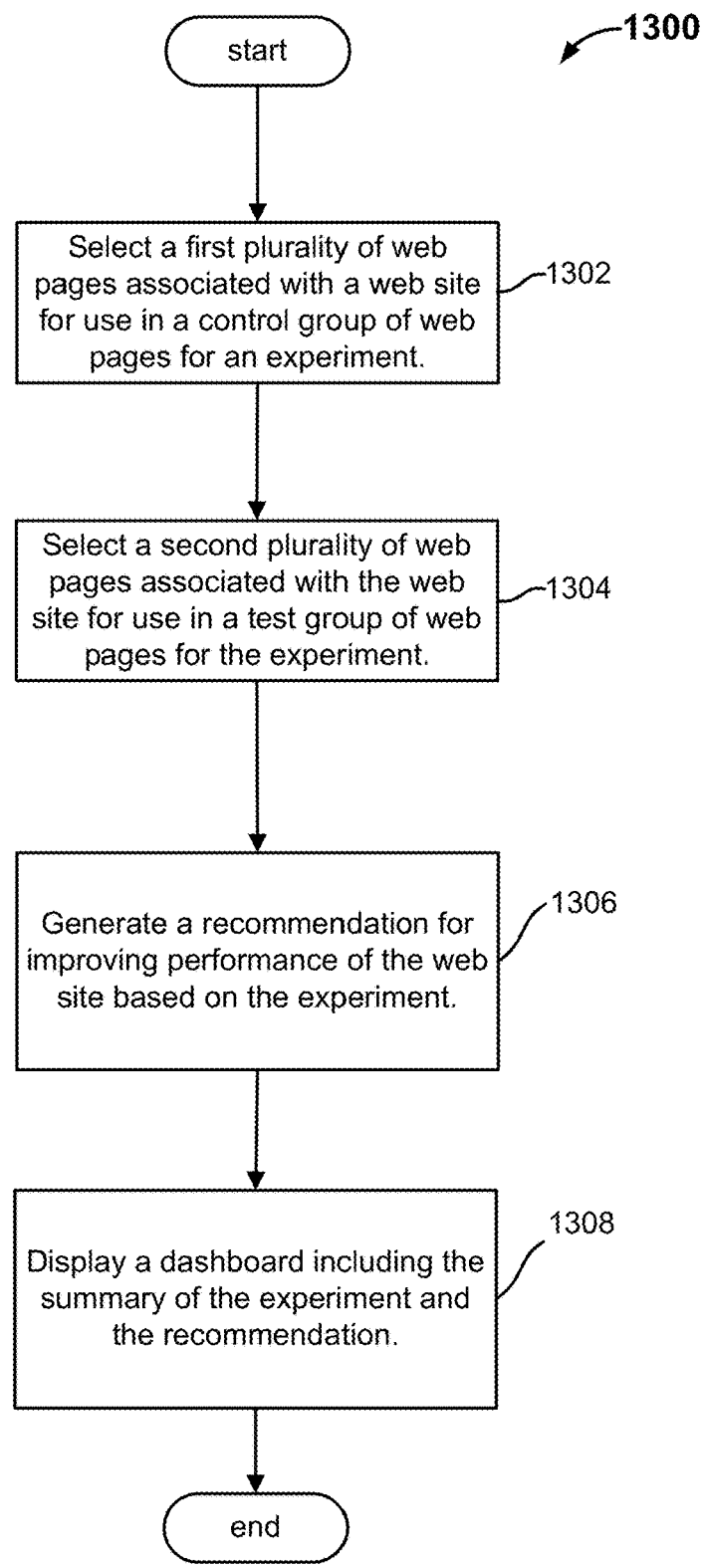
FIG. 13 is a flow diagram illustrating a process for providing control selection and analysis of SEO activities for web sites in accordance with some embodiments.

Example Processes for Providing Control Selection and Analysis of SEO Activities for Web Sites for Web Service Providers FIG. 13 is a flow diagram illustrating a process for providing control selection and analysis of SEO activities for web sites in accordance with some embodiments. In one embodiment, a process 1300 is performed by a system for providing control selection and analysis of SEO activities for web sites, such as described above with respect to FIGS. 1-6.

The process begins at 1302. At 1302, selecting a first plurality of web pages associated with a web site for use in a control group of web pages for an experiment is performed.

At 1304, selecting a second plurality of web pages associated with the web site for use in a test group of web pages for the experiment is performed. For example, the test group of web pages can be configured with an SEO content improvement activity (e.g., using SEO widgets or other SEO content improvement activities) using the disclosed techniques, such as similarly described above.

At 1306, generating a recommendation for improving performance of the web site based on the experiment is performed.

At 1308, displaying a dashboard including the summary of the experiment and the recommendation is performed.

Figure 14:
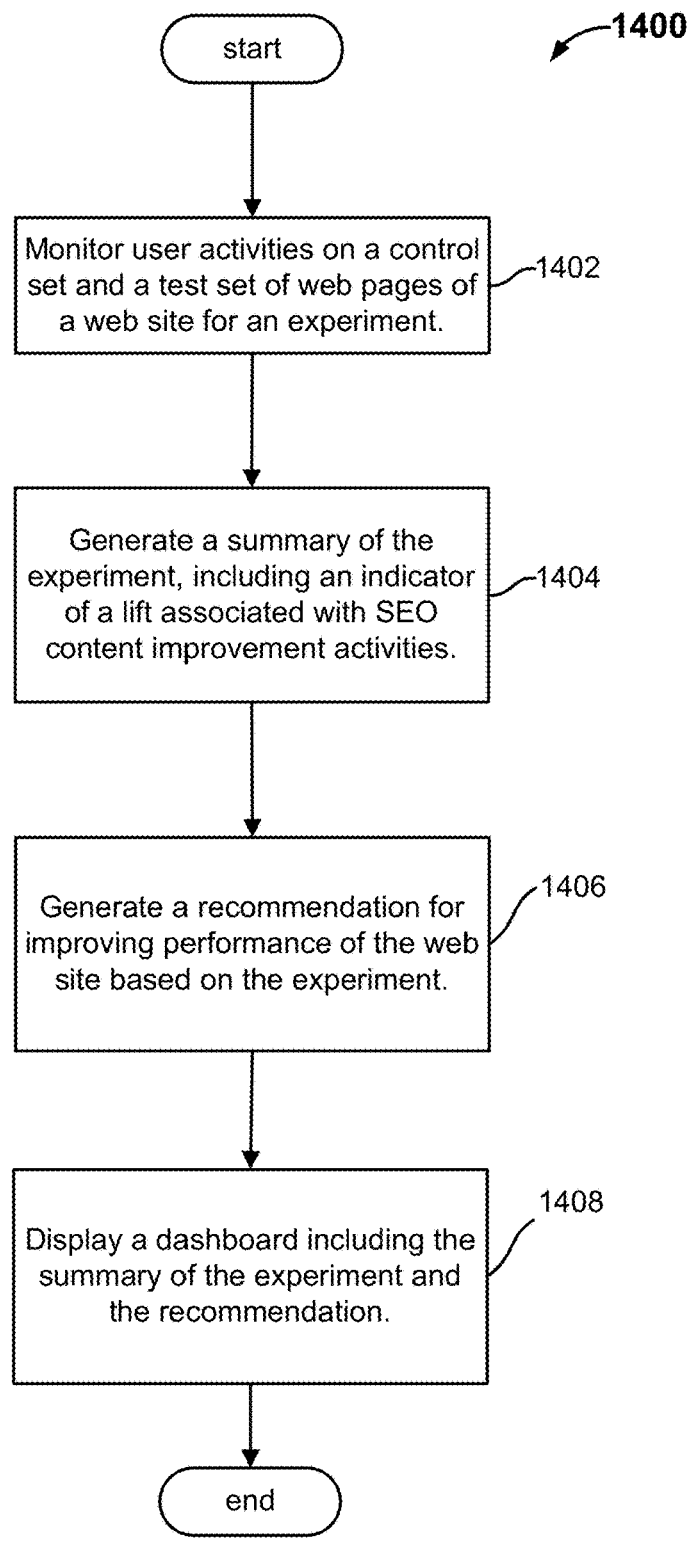
FIG. 14 is another flow diagram illustrating a process for providing control selection and analysis of SEO activities for web sites in accordance with some embodiments.

FIG. 14 is a flow diagram illustrating a process for providing control selection and analysis of SEO activities for web sites in accordance with some embodiments. In one embodiment, a process 1400 is performed by a system for providing control selection and analysis of SEO activities for web sites, such as described above with respect to FIGS. 1-6.

The process begins at 1402. At 1402, user activities on a control set and a test set of web pages of a web site are monitored for an experiment (e.g., for a duration of the experiment). For example, pixel log techniques can be performed to monitor various user activities on the web site (e.g., a merchant/e-commerce web site or other web site), such as similarly described above. As another example, visits to the test URLs and control URLs can be measured using commercially available or open source analytics software/tools, such as BloomReach Analytics such as similarly described above with respect to FIGS. 1-3, and/or other commercially available web analytics software/tools, such as Omniture, Coremetrics, and/or Google Analytics, such as similarly described above.

At 1404, a summary of the experiment, including an indicator of a lift associated with SEO content improvement activities, is generated. For example, a report can include a calculated lift based on the experiment, in which the lift can be associated with the SEO content improvement activities on the test set of web pages (e.g., using SEO widgets or other SEO content improvement activities) using the disclosed techniques, such as similarly described above.

At 1406, a recommendation for improving performance of the web site (e.g., organic search result related performance) based on the experiment is generated. For example, the recommendation can be a recommended action to add the SEO content improvement activity to other pages (e.g., additional or all pages) on the web site, and/or other actions for improving web site performance, based on the results of the experiment indicating an associated lift resulting from the SEO content improvement activity on the test pages, such as similarly described above.

At 1408, a dashboard is displayed including the summary of the experiment and the recommendation. For example, the dashboard can be displayed as a Graphical User Interface (GUI) using a front-end server (e.g., a web server), such as similarly described above.

Figure 15:
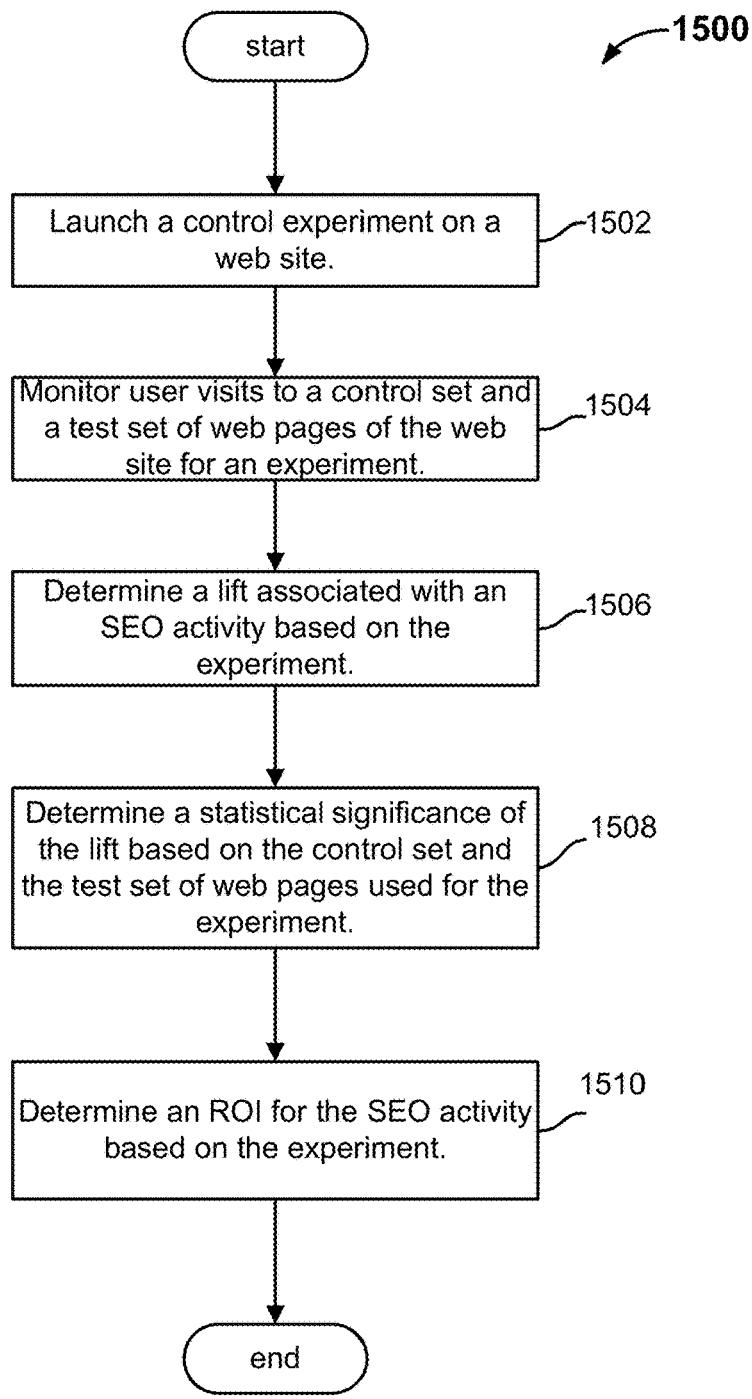
FIG. 15 is another flow diagram illustrating a process for providing control selection and analysis of SEO activities for web sites in accordance with some embodiments.

FIG. 15 is another flow diagram illustrating a process for providing control selection and analysis of SEO activities for web sites in accordance with some embodiments. In one embodiment, a process 1500 is performed by a system for providing control selection and analysis of SEO activities for web sites, such as described above with respect to FIGS. 1-6.

The process begins at 1502. At 1502, a control experiment on a web site is launched. For example, the control experiment can be launched and stopped using a web tool as similarly described above.

At 1504, user visits to a control set and a test set of web pages of the web site are monitored for the experiment (e.g., for a duration of the experiment). For example, visits to the test URLs and control URLs can be measured using commercially available or open source analytics software/tools, such as BloomReach Analytics such as similarly described above with respect to FIGS. 1-3, and/or other commercially available web analytics software/tools, such as Omniture, Coremetrics, and/or Google Analytics, such as similarly described above.

At 1506, lift (if any) associated with an SEO activity (e.g., SEO content improvement activity) based on the experiment is determined. For example, the lift can be calculated using the above-described lift calculation techniques.

At 1508, a statistical significance of the lift based on the control set and the test set of web pages used for the experiment is determined. For example, the statistical significance of the lift based on the control set and the test set of web pages used for the experiment can be calculated using the above-described statistical significance calculation techniques.

At 1510, an ROI for the SEO activity (e.g., SEO content improvement activity) based on the experiment is determined. For example, the ROI can be calculated based on a cost for the SEO improvement activity and the incremental revenue associated with the lift using the above-described ROI calculation techniques.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing control selection and analysis of Search Engine Optimization (SEO) activities for web sites, comprising:
a processor configured to:
select a first plurality of web pages associated with a web site for use in a control group of web pages for an experiment;
select a second plurality of web pages associated with the web site for use in a test group of web pages for the experiment;
canonicalize the control group of web pages and the test group of web pages, comprising to:
remove one or more web pages from the control group or the test group based on an outlier determination, wherein the outlier determination results from a determination that the one or more web pages have no corresponding web page in the other group based on one or more selected dimensions, wherein the one or more selected dimensions are selected from a page type, a visit level, or a department, wherein the one or more web pages have no corresponding web page in the other group includes at least one or more of the following: a web page with an Hypertext Transfer Protocol (HTTP) error, a web pages with a redirect, a web page that is no longer available for crawling by a search engine, or a web page that has a change in a canonical tag; and perform the experiment to determine a performance of the test group of web pages relative to the control group of web pages; and a memory coupled to the processor and configured to provide the processor with instructions.

2. The system recited in claim 1, wherein determine the performance of the test group of web pages relative to the control group of web pages further comprises:

measure the performance of the test group of web pages relative to the control group of web pages based on monitored user activities on the web site associated with organic search result activities, wherein the experiment includes one or more automated SEO widgets associated with the test group of web pages.

3. The system recited in claim 1, wherein the experiment includes one or more automated SEO widgets associated with the test group of web pages, and wherein determine the performance of the test group of web pages relative to the control group of web pages further comprises:

determine whether any of the one or more automated SEO widgets improves performance of the web site based on monitored user activities on the web site associated with organic search result activities.

4. The system recited in claim 1, wherein the processor is further configured to:

generate a recommendation for improving performance of organic search results on the web site based on the experiment.

5. The system recited in claim 1, wherein the processor is further configured to:

generate a recommendation for improving performance of organic search results on the web site based on the experiment, wherein the recommendation includes an indication of whether one or more automated SEO widgets improve performance of the web site based on monitored user activities on the web site associated with organic search result activities.

6. The system recited in claim 1, wherein the processor is further configured to:

display a dashboard.

7. The system recited in claim 1, wherein the processor is further configured to:

display a dashboard, wherein the dashboard displays a summary of results of the experiment based on monitored user activities on the web site associated with organic search result activities.

8. The system recited in claim 1, wherein the processor is further configured to:

display a dashboard, wherein the dashboard displays a recommendation for improving performance of organic search results on the web site based on the experiment, wherein the recommendation includes an indication of whether one or more automated SEO widgets improve performance of the web site based on monitored user activities on the web site associated with organic search result activities.

9. The system recited in claim 1, wherein the processor is further configured to:

monitor user activities on the web site associated with organic search result activities to determine results of the experiment.

10. The system recited in claim 1, wherein the processor is further configured to:

monitor user activities on the web site associated with organic search result activities to determine results of the experiment; and generate a dashboard for displaying a summary of results of the experiment based on monitored user activities on the web site associated with organic search result activities.

11. The system recited in claim 1, wherein the processor is further configured to:

monitor user activities on the web site associated with organic search result activities to determine results of the experiment; and generate a recommendation for improving performance of organic search results on the web site based on the experiment, wherein the recommendation includes an indication of whether one or more automated SEO widgets improve performance of the web site based on monitored user activities on the web site associated with organic search result activities.

12. The system recited in claim 1, wherein the one or more web pages have no corresponding web page in the other group includes at least two or more of the following: a web page with an Hypertext Transfer Protocol (HTTP) error, a web pages with a redirect, a web page that is no longer available for crawling by a search engine, or a web page that has a change in a canonical tag.

13. The system recited in claim 1, wherein the one or more web pages have no corresponding web page in the other group includes at least three or more of the following: a web page with an Hypertext Transfer Protocol (HTTP) error, a web pages with a redirect, a web page that is no longer available for crawling by a search engine, or a web page that has a change in a canonical tag.

14. The system recited in claim 1, wherein the one or more web pages have no corresponding web page in the other group includes: a web page with an Hypertext Transfer Protocol (HTTP) error, a web pages with a redirect, a web page that is no longer available for crawling by a search engine, and a web page that has a change in a canonical tag.

15. A method of providing control selection and analysis of Search Engine Optimization (SEO) activities for web sites, comprising:

selecting a first plurality of web pages associated with a web site for use in a control group of web pages for an experiment;

selecting a second plurality of web pages associated with the web site for use in a test group of web pages for the experiment;

canonicalizing the control group of web pages and the test group of web pages, comprising:

removing one or more web pages from the control group or the test group based on an outlier determination, wherein the outlier determination results from a determination that the one or more web pages have no corresponding web page in the other group based on one or more selected dimensions, wherein the one or more selected dimensions are selected from a page type, a visit level, or a department, wherein the one or more web pages have no corresponding web page in the other group includes at least one or more of the following: a web page with an Hypertext Transfer Protocol (HTTP) error, a web pages with a redirect, a web page that is no longer available for crawling by a search engine, or a web page that has a change in a canonical tag; and performing the experiment using a processor to determine a performance of the test group of web pages relative to the control group of web pages.

16. The method of claim 15, wherein determining the performance of the test group of web pages relative to the control group of web pages further comprises:

measuring the performance of the test group of web pages relative to the control group of web pages based on monitored user activities on the web site associated with organic search result activities, wherein the experiment includes one or more automated SEO widgets associated with the test group of web pages.

17. The method of claim 15, wherein the experiment includes one or more automated SEO widgets associated with the test group of web pages, and wherein determining the performance of the test group of web pages relative to the control group of web pages further comprises:

determining whether any of the one or more automated SEO widgets improves performance of the web site based on monitored user activities on the web site associated with organic search result activities.

18. A computer program product for providing control selection and analysis of Search Engine Optimization (SEO) activities for web sites, the computer program product being embodied in a tangible computer readable storage medium and comprising computer instructions for:

selecting a first plurality of web pages associated with a web site for use in a control group of web pages for an experiment;

selecting a second plurality of web pages associated with the web site for use in a test group of web pages for the experiment;

canonicalizing the control group of web pages and the test group of web pages, comprising:

removing one or more web pages from the control group or the test group based on an outlier determination, wherein the outlier determination results from a determination that the one or more web pages have no corresponding web page in the other group based on one or more selected dimensions, wherein the one or more selected dimensions are selected from a page type, a visit level, or a department, wherein the one or more web pages have no corresponding web page in the other group includes at least one or more of the following: a web page with an Hypertext Transfer Protocol (HTTP) error, a web pages with a redirect, a web page that is no longer available for crawling by a search engine, or a web page that has a change in a canonical tag; and performing the experiment to determine a performance of the test group of web pages relative to the control group of web pages.

\* \* \* \* \*